(12) United States Patent
Kishi et al.

(10) Patent No.: US 9,222,422 B2
(45) Date of Patent: Dec. 29, 2015

(54) OUTPUT CHARACTERISTIC CONTROL DEVICE FOR INTERNAL COMBUSTION ENGINE

(75) Inventors: Daigo Kishi, Sagamihara (JP);
Shuusaku Katakura, Fujisawa (JP);
Yoshinori Yamamoto, Isehara (JP);
Kenichiro Murakami, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 230 days.

(21) Appl. No.: 13/980,768

(22) PCT Filed: Dec. 16, 2011

(86) PCT No.: PCT/JP2011/079177
§ 371 (c)(1),
(2), (4) Date: Jul. 19, 2013

(87) PCT Pub. No.: WO2012/098795
PCT Pub. Date: Jul. 26, 2012

(65) Prior Publication Data
US 2013/0297190 A1 Nov. 7, 2013

(30) Foreign Application Priority Data

Jan. 20, 2011 (JP) .................................. 2011-009601
Jun. 28, 2011 (JP) .................................. 2011-143177

(51) Int. Cl.
*F02D 31/00* (2006.01)
*F02D 11/10* (2006.01)
(Continued)

(52) U.S. Cl.
CPC .............. *F02D 31/00* (2013.01); *F02D 11/105* (2013.01); *F02D 29/02* (2013.01); *F02D 41/021* (2013.01); *F02D 2200/501* (2013.01)

(58) Field of Classification Search
CPC .. F02D 31/00; F02D 11/105; F02D 2200/501
USPC .......... 701/110, 101, 102, 103, 104; 123/675, 123/683, 687, 492
See application file for complete search history.

(56) References Cited

U.S. PATENT DOCUMENTS 4,834,045 A * 5/1989 Imai et al. ..................... 123/352
5,021,958 A * 6/1991 Tokoro ............................ 701/98
(Continued)

FOREIGN PATENT DOCUMENTS

JP 10-148147 A 6/1998
JP 2008-049836 A 3/2008
(Continued)

*Primary Examiner* — Mahmoud Gimie
(74) *Attorney, Agent, or Firm* — Foley & Lardner LLP

(57) ABSTRACT

An output characteristic control device for an internal combustion engine includes a road traffic environment detection unit configured to detect a road traffic environment in which an own vehicle is running, a recommended vehicle speed calculation unit configured to calculate a recommended vehicle speed of the own vehicle in the detected road traffic environment, a target output characteristic setting unit configured to set a target output characteristic of the internal combustion engine so that an output of the internal combustion engine corresponding to an accelerator operation amount is reduced as a vehicle speed difference between the recommended vehicle speed and an own-vehicle speed decreases, and an output characteristic changing unit configured to change the output characteristic of the internal combustion engine to the target output characteristic.

13 Claims, 25 Drawing Sheets

(51) Int. Cl.
*F02D 29/02* (2006.01)
*F02D 41/02* (2006.01)

(56) References Cited

U.S. PATENT DOCUMENTS

| | | | |
|---|---|---|---|
| 5,345,907 A * | 9/1994 | Matsuoka | 123/399 |
| 6,016,457 A | 1/2000 | Toukura et al. | |
| 7,155,341 B2 | 12/2006 | Kimura et al. | |
| 7,308,961 B2 * | 12/2007 | Satou et al. | 180/170 |
| 2003/0236624 A1 | 12/2003 | Kimura et al. | |
| 2004/0040765 A1* | 3/2004 | Satou et al. | 180/170 |
| 2007/0152657 A1 | 7/2007 | Yabe et al. | |
| 2013/0085655 A1* | 4/2013 | Kii et al. | 701/103 |

FOREIGN PATENT DOCUMENTS

| | | |
|---|---|---|
| JP | 2008-063944 A | 3/2008 |
| JP | 2008-087562 A | 4/2008 |
| JP | 2008-215237 A | 9/2008 |
| JP | 2009-067385 A | 4/2009 |
| JP | 2009-275558 A | 11/2009 |
| JP | 2008-233110 A | 3/2010 |
| JP | 2010-236479 A | 10/2010 |
| JP | 2010-284979 A | 12/2010 |
| JP | 2010-052561 A | 3/2011 |

* cited by examiner

OUTPUT CHARACTERISTIC CONTROL DEVICE FOR INTERNAL COMBUSTION ENGINE

FIELD OF THE INVENTION

This invention relates to an output characteristic control device for an internal combustion engine.

BACKGROUND

In a vehicle control device disclosed in JP2008-233110A, a table (hereinafter, referred to as an "output characteristic table") associating an accelerator pedal depression amount (hereinafter, referred to as an "accelerator operation amount") with an opening of a throttle valve (hereinafter, referred to as a "throttle opening") is stored in advance and the throttle opening is controlled based on the accelerator operation amount by referring to this output characteristic table. Two tables, i.e. a table for normal running and a table for running in slow traffic are stored in advance as output characteristic tables and the output characteristic table to be referred to is switched according to a running scene. The table for running in slow traffic is so set that the value of the throttle opening corresponding to the accelerator operation amount is smaller than in the table for normal running. In this way, drivability and fuel economy during running in slow traffic have been improved by reducing an output characteristic of an internal combustion engine during running in slow traffic than during normal running.

SUMMARY

During normal running, a driver usually increases a vehicle speed up to about 60 [km/h] if a speed limit of a road on which a vehicle is running changes from 40 [km/h] to 60 [km/h]. However, such as when the driver is inexperienced in driving technique, a subtle accelerator operation cannot be performed in adjusting the vehicle speed and an accelerator pedal may be excessively depressed so that the speed limit is exceeded. If this occurs, the accelerator pedal is returned to reduce the vehicle speed after the speed limit is exceeded, with the result that unnecessary acceleration is performed and, hence, fuel economy is deteriorated.

Accordingly, there has been a problem that fuel economy tends to be deteriorated depending on the driving technique of a driver if a control is executed to reduce an output characteristic of an internal combustion engine only during running in slow traffic as in the conventional vehicle control device described above.

The present invention was developed in view of such a problem and an object thereof is to suppress the deterioration of fuel economy due to differences in the driving technique among drivers by properly controlling an output characteristic of an internal combustion engine according to a running scene and a vehicle driving condition.

To achieve the above object, according to one aspect of the present invention, an output characteristic control device for an internal combustion engine is provided which detects a road traffic environment in which an own vehicle is running, calculates a recommended vehicle speed of the own vehicle in the detected road traffic environment, sets a target output characteristic of the internal combustion engine so that an output of the internal combustion engine corresponding to an accelerator operation amount is reduced as a vehicle speed difference between the recommended vehicle speed and an own-vehicle speed decreases, and changes the output characteristic of the internal combustion engine to the target output characteristic.

Embodiments and advantages of this invention will be described in detail below with reference to the attached figures.

DETAILED DESCRIPTION

First Embodiment

Figure 1:
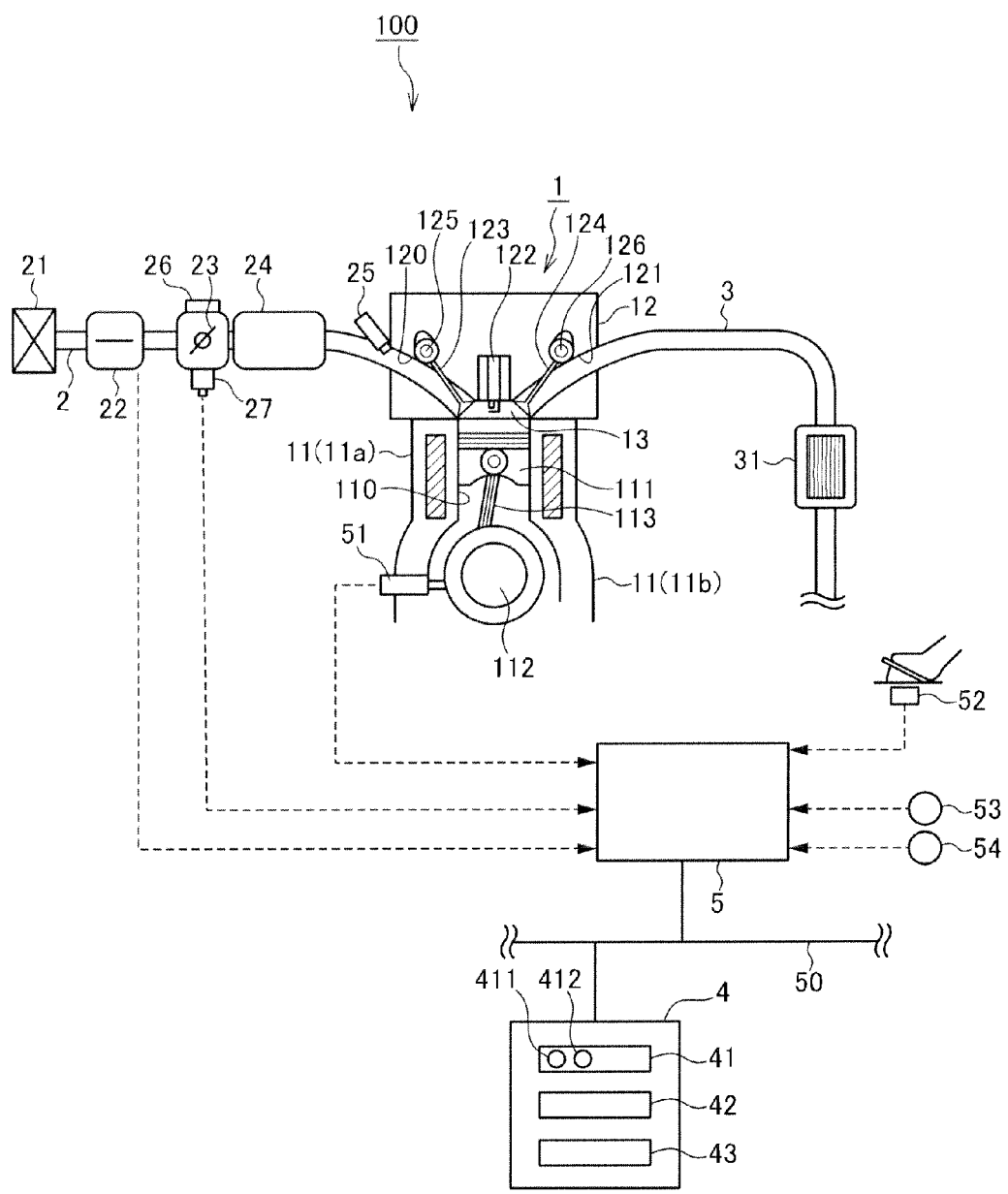
FIG. 1 is a schematic configuration diagram of an output characteristic control device for a spark-ignited internal combustion engine according to a first embodiment of the present invention.

FIG. 1 is a schematic configuration diagram of an output characteristic control device 100 for a spark-ignited internal combustion engine (hereinafter, referred to as an "engine") 1 according to one embodiment of the present invention.

The output characteristic control device 100 of the engine 1 includes an engine 1 for generating a drive force of a vehicle, an intake passage 2 in which air to be sucked into the engine 1 (hereinafter, referred to as "intake air") flows, an exhaust passage 3 in which combustion gas discharged from the engine 1 (hereinafter, referred to as "exhaust air") flows, a navigation device 4 and a controller 5.

The engine 1 includes a cylinder block 11 and a cylinder head 12.

The cylinder block 11 includes a cylinder part 11a and a crank case part 11b.

The cylinder part 11a is formed with a plurality of cylinders 110. A piston 111 which reciprocates in the cylinder 110 under a combustion pressure is accommodated in the cylinder 110.

The crank case part 11b is formed below the cylinder part 11a. The crank case part 11b rotatably supports a crankshaft 112. The crankshaft 112 translates a reciprocal motion of the piston 111 into a rotational motion via a conrod 113.

The cylinder head 12 is mounted on the upper surface of the cylinder block 11 and forms a part of a combustion chamber 13 together with the cylinder 110 and the piston 111.

The cylinder head 12 is formed with an intake port 120 which is connected to the intake passage 2 and open on the top wall of the combustion chamber 13 and an exhaust port 121 which is connected to the exhaust passage 3 and open on the top wall of the combustion chamber 13, and an ignition plug 122 is provided to face the center of the top wall of the combustion chamber 13. The cylinder head 12 is also provided with an intake valve 123 for opening and closing an opening between the combustion chamber 13 and the intake port 120 and an exhaust valve 124 for opening and closing an opening between the combustion chamber 13 and the exhaust port 121. The cylinder head 12 is further provided with an intake camshaft 125 for driving the intake valve 123 to open and close and an exhaust camshaft 126 for driving the exhaust valve 124 to open and close.

An air cleaner 21, an air flow meter 22, an electrically controlled throttle valve 23, an intake collector 24 and a fuel injection valve 25 are successively provided from an upstream side in the intake passage 2.

The air cleaner 21 removes foreign substances such as sand included in intake air.

The air flow meter 22 detects a flow rate of intake air (hereinafter, referred to as an "intake air amount").

The throttle valve 23 adjusts the amount of intake air flowing into the intake collector 24 by changing a passage cross-sectional area of the intake passage continuously or in a stepwise manner. The throttle valve 23 is driven to open and close by a throttle actuator 26. A throttle opening is detected by a throttle sensor 27.

The intake collector 24 equally distributes the air, which has flowed thereinto, into each cylinder 110.

The fuel injection valve 25 injects fuel toward the intake port 120 according to an operating condition of the engine 1.

A three-way catalyst 31 for removing toxic substances such as hydrocarbons and nitrogen oxides in exhaust air is provided in the exhaust passage 3.

The navigation device 4 includes an own-vehicle position detection unit 41, a storage unit 42 and a communication unit 43.

The own-vehicle position detection unit 41 detects an own-vehicle position by receiving radio waves from a GPS satellite by a GPS (Global Positioning System) sensor 411. Further, a running direction and an altitude of the vehicle are calculated based on detection values of a 3D gyro sensor 412.

Map information including roads and facilities on roads is stored in the storage unit 42. More specifically, information such as widths and the number of traffic lanes of roads, gradients, speed limits, the presence or absence of traffic lights and railroad crossings, radii of curvature of curves, intersections and toll booths is stored.

The communication unit 43 receives road traffic information transmitted from a road traffic information communication system center by a receiver.

Pieces of information such as the own-vehicle position, the map information and the road traffic information obtained by the navigation device 4 are collectively referred to as navigation information.

The controller 5 is configured by a microcomputer including a central processing unit (CPU), a read only memory (ROM), a random access memory (RAM) and an input/output interface (I/O interface). The navigation device 4 and the controller 5 are connected to a CAN (Controller Area Network) communication line 50 and transmit and receive data to and from each other by CAN communication.

To the controller 5 are input signals from various sensors such as an engine rotation speed sensor 51 for detecting an engine rotation speed based on a crank angle, an accelerator stroke sensor 52 for detecting an accelerator operation amount, a vehicle speed sensor 53 for detecting a speed of the own vehicle (own-vehicle speed) and an inter-vehicle distance sensor 54 for detecting an inter-vehicle distance between the own vehicle and the preceding vehicle by radiating millimeter waves to the front side of the own vehicle and receiving the millimeter waves reflected by the preceding vehicle in addition to signals from the throttle sensor 27 and the navigation device 4 described above.

The controller 5 appropriately changes an output characteristic of the engine 1 based on these signals. Specifically, the value of the throttle opening corresponding to the accelerator operation amount is appropriately changed. An output characteristic control of the engine 1 according to this embodiment is described below.

Figure 2:
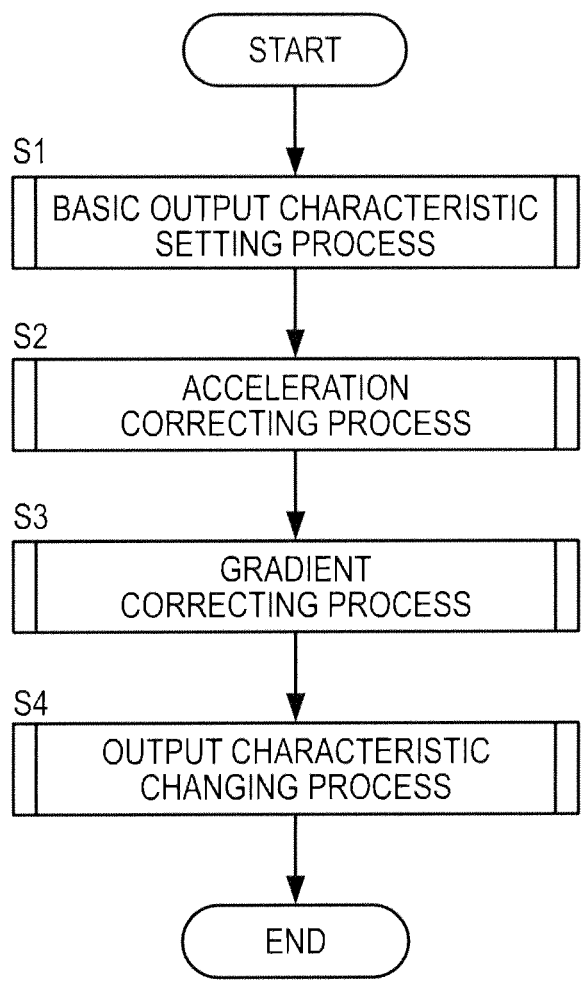
FIG. 2 is a flow chart showing an output characteristic control of the engine according to the first embodiment of the present invention.

FIG. 2 is a flow chart showing the output characteristic control of the engine 1 according to the present embodiment. The controller 5 executes this routine in a predetermined computation cycle (e.g. 10 [ms]).

In Step S1, the controller 5 performs a basic output characteristic setting process for setting the output characteristic of the engine 1 to a characteristic in which the vehicle easily runs at a recommended vehicle speed to be described later (hereinafter, referred to as a "basic output characteristic"). The basic output characteristic setting process is described in detail later with reference to FIGS. 3 to 6.

In Step S2, the controller 5 performs an acceleration correcting process. The acceleration correcting process is a process for correcting the output characteristic of the engine 1 to a characteristic suitable, for example, at startup and during sudden acceleration when an accelerator pedal is depressed with a strong intention to accelerate. The acceleration correcting process is described in detail later with reference to FIG. 7.

In Step S3, the controller 5 performs a gradient correcting process. The gradient correcting process is a process for correcting the output characteristic of the engine 1 to a characteristic suitable for the gradient of a road on which the own vehicle is currently running. The gradient correcting process is described in detail later with reference to FIG. 8.

In Step S4, the controller 5 performs an output characteristic changing process. The output characteristic changing process is a process for setting a target output characteristic based on the result of each process from Steps S1 to S3 and changing the output characteristic of the engine 1 to the target output characteristic. The output characteristic changing process is described in detail later with reference to FIG. 9.

Figure 3:
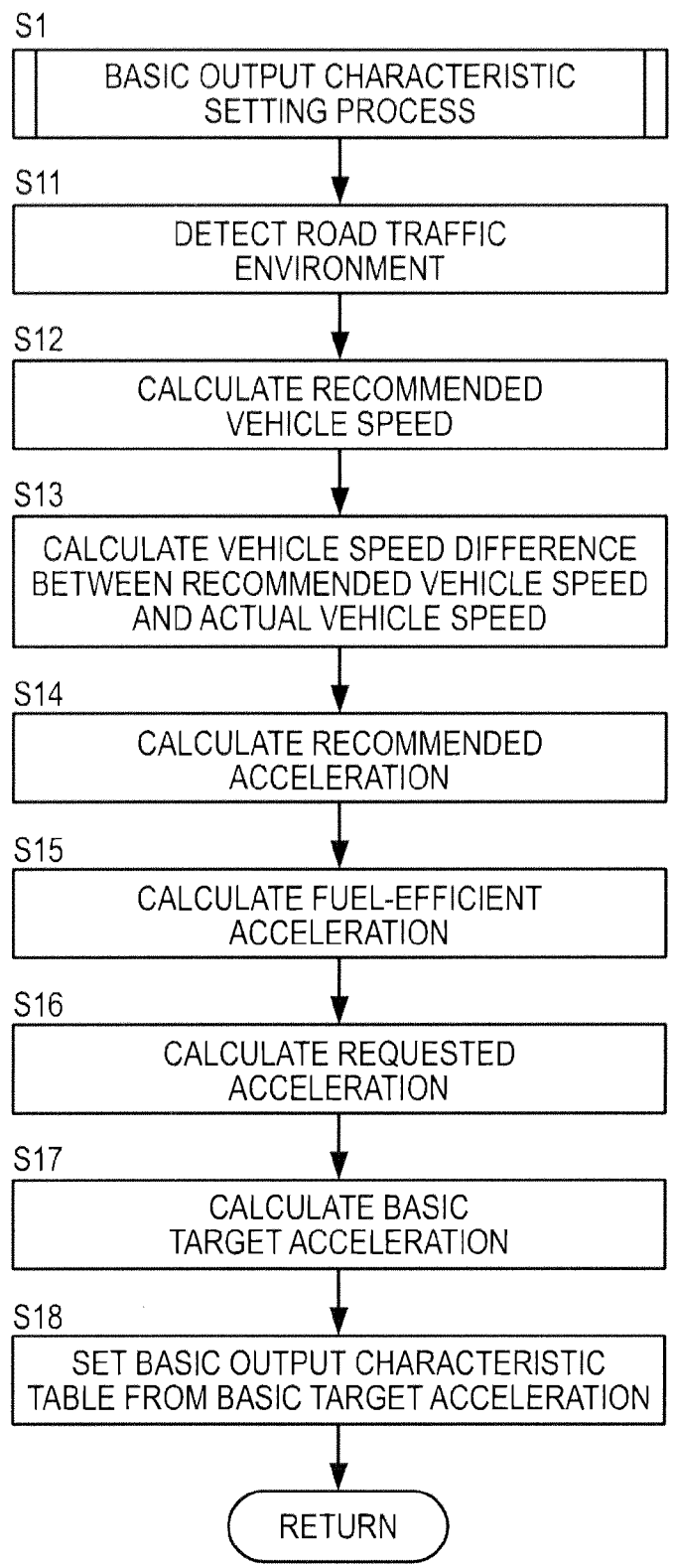
FIG. 3 is a flow chart showing a basic output characteristic setting process according to the first embodiment of the present invention.

FIG. 3 is a flow chart showing the basic output characteristic setting process.

In Step S11, the controller 5 detects an environment of a road on which the own vehicle is currently running (hereinafter, referred to as a "road traffic environment") such as the shape and speed limit of the currently running road, a relative relationship with surrounding vehicles, a degree of traffic jam and the presence or absence of a traffic light based on the navigation information and inter-vehicle distances.

In Step S12, the controller 5 calculates a recommended vehicle speed, at which the own vehicle can comfortably and fuel-efficiently run, based on the road traffic environment.

For example, when the vehicle is running on a road whose speed limit is 40 [km/h], the recommended vehicle speed is basically set to 40 [km/h] if an inter-vehicle distance to the preceding vehicle is sufficient and that road is straight. If the speed limit is switched from 40 [km/h] to 60 [km/h] while the vehicle is running in such a situation, the recommended vehicle speed is basically set to 60 [km/h].

On the other hand, if the inter-vehicle distance to the preceding vehicle is short, the recommended vehicle speed is appropriately set to a vehicle speed lower than the speed limit according to the inter-vehicle distance. Also when the road is curved, the recommended speed is appropriately set to a vehicle speed lower than the speed limit according to a radius of curvature of that road. The recommended speed is also appropriately set to a vehicle speed lower than the speed limit such as when there is a traffic light or an intersection ahead or when the vehicle is stuck in a traffic jam. In this way, the recommended vehicle speed is appropriately set according to the road traffic environment.

In the present embodiment, the output characteristic of the engine 1 is controlled to such a characteristic that the own-vehicle speed easily converges to this recommended vehicle speed. That is, the output characteristic of the engine 1 is controlled to a characteristic in which the vehicle easily runs at the recommended vehicle speed.

In Step S13, the controller 5 calculates a vehicle speed difference between the recommended vehicle speed and the own-vehicle speed.

Figure 4:
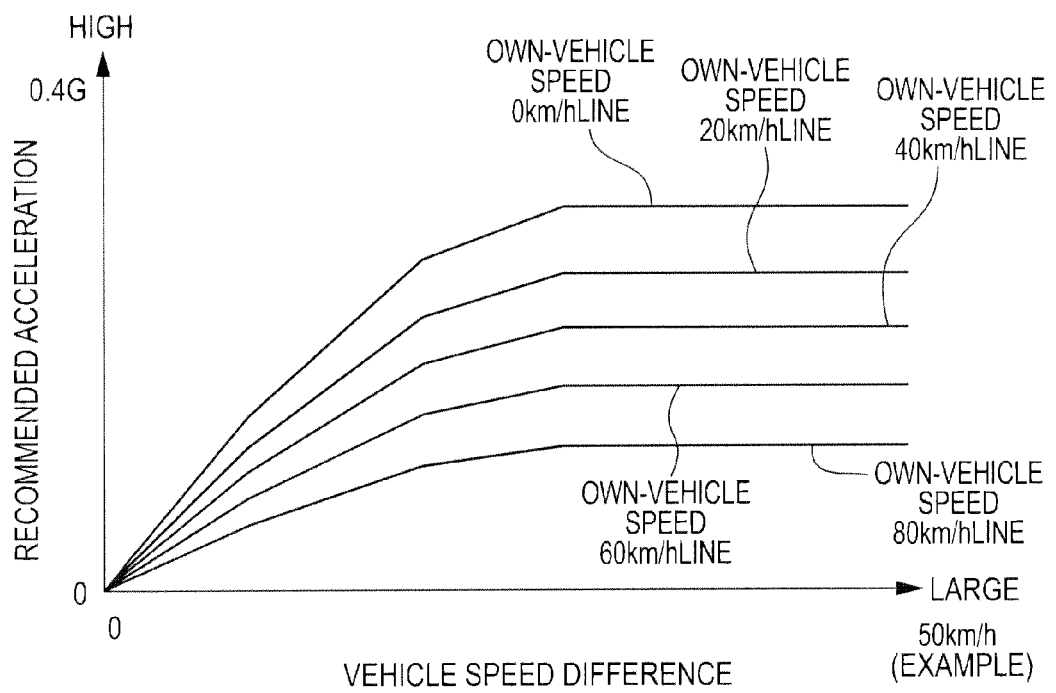
FIG. 4 is a map for calculating a recommended acceleration based on a vehicle speed difference and an actual vehicle speed.

In Step S14, the controller 5 calculates an acceleration suitable for accelerating the own vehicle toward the recommended vehicle speed (hereinafter, referred to as a "recommended acceleration") based on the vehicle speed difference and the own-vehicle speed by referring to a map of FIG. 4 specified by an experiment or the like in advance. As shown in the map of FIG. 4, the recommended acceleration decreases as the vehicle speed difference decreases, i.e. as the own-vehicle speed approaches the recommended vehicle speed. Further, the recommended acceleration is higher when the own-vehicle speed is low than when the own-vehicle speed is high.

Figure 5:
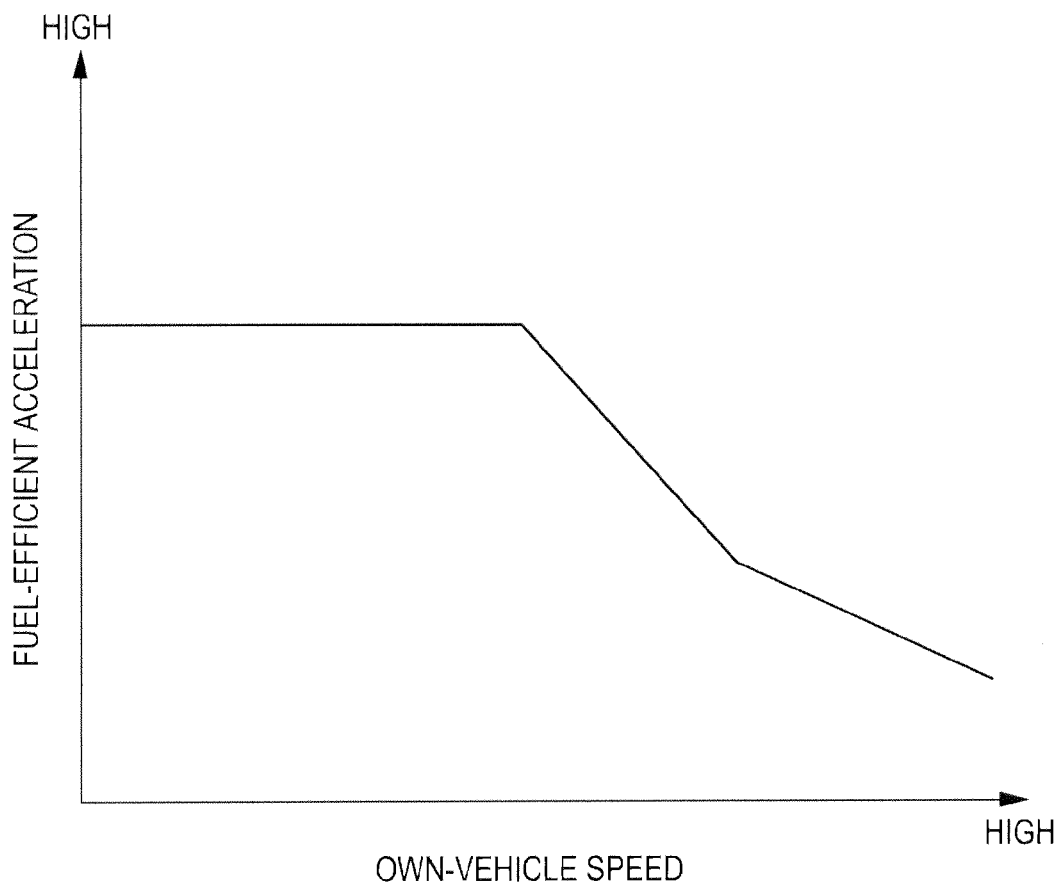
FIG. 5 is a table for calculating a fuel-efficient acceleration based on the actual vehicle speed.

In Step S15, the controller 5 calculates an acceleration suitable for fuel-efficiently accelerating the own vehicle (hereinafter, referred to as a "fuel-efficient acceleration") based on the own-vehicle speed by referring to a table of FIG. 5 specified by an experiment or the like in advance. As shown in the table of FIG. 5, the fuel-efficient acceleration is constant until the own-vehicle speed reaches a predetermined vehicle speed and gradually decreases after the own-vehicle speed exceeds the predetermined vehicle speed.

In Step S16, the controller 5 calculates an acceleration requested by the driver (hereinafter, referred to as a "requested acceleration") based on the accelerator operation amount and the own-vehicle speed by referring to a map specified by an experiment or the like in advance.

In Step S17, the controller 5 calculates a basic target acceleration. Specifically, the recommended acceleration and the fuel-efficient acceleration are compared and the lower one is set as a provisional target acceleration. Then, the provisional target acceleration and the requested acceleration are compared and the higher one is set as the basic target acceleration.

In Step S18, the controller 5 sets an optimal table as a basic output characteristic table out of a plurality of output characteristic tables (tables associating the accelerator operation amount and the throttle opening) based on the basic target acceleration. Specifically, the basic output characteristic table is so set based on the basic target acceleration that the higher the basic target acceleration, the larger the value of the throttle opening corresponding to the accelerator operation amount.

Figure 6:
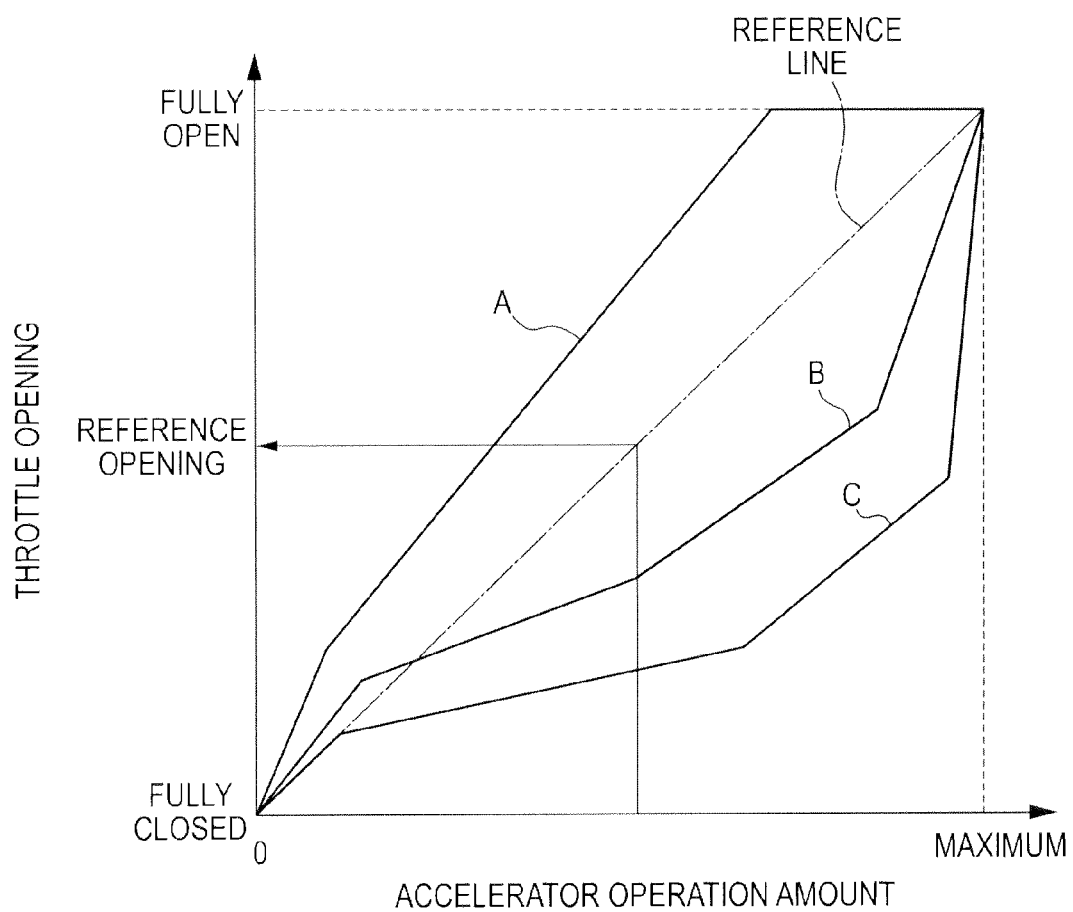
FIG. 6 is a graph showing a basic output characteristic table.

FIG. 6 is a graph showing the basic output characteristic table. A dashed-dotted line of FIG. 6 is a reference line on which a ratio of the throttle opening and the accelerator operation amount is 1 to 1, i.e. the throttle opening is zero (fully closed) if the accelerator operation amount is zero, the throttle opening is half if the accelerator operation amount is half and the throttle opening is maximum (fully open) if the accelerator operation amount is maximum. The throttle opening calculated in accordance with this reference line is referred to as a reference opening below.

If the vehicle speed difference between the recommended vehicle speed and the own-vehicle speed is relatively large, the basic output characteristic table is so set that the value of the throttle opening corresponding to the accelerator operation amount is larger than the reference opening as shown by a solid line A. This is because a strong acceleration force toward the recommended vehicle speed is thought to be required if the vehicle speed difference between the recommended vehicle speed and the own-vehicle speed is relatively large.

As the vehicle speed difference between the recommended vehicle speed and the own-vehicle speed becomes relatively smaller, the basic output characteristic table is so set that the value of the throttle opening corresponding to the accelerator operation amount becomes gradually smaller as shown by a solid line B or C.

It should be noted that the solid line B shows an example of the basic output characteristic table set when the vehicle speed difference between the recommended vehicle speed and the own-vehicle speed becomes relatively smaller and a moderate acceleration force is required toward the recommended acceleration. The solid line C shows an example of the basic output characteristic table set when the vehicle speed difference between the recommended vehicle speed and the own-vehicle speed becomes substantially zero, and represents an output characteristic suitable for constant speed running at the recommended vehicle speed.

Since the acceleration force can be gradually reduced as the own-vehicle speed approaches the recommended vehicle speed by doing so, the own-vehicle speed can more easily naturally converge to the recommended vehicle speed. That is, since the own-vehicle speed can more easily converge to the recommended vehicle speed without requiring a subtle accelerator operation to the driver, a variation of a fuel economy effect due to differences in driving technique can be suppressed.

Figure 7:
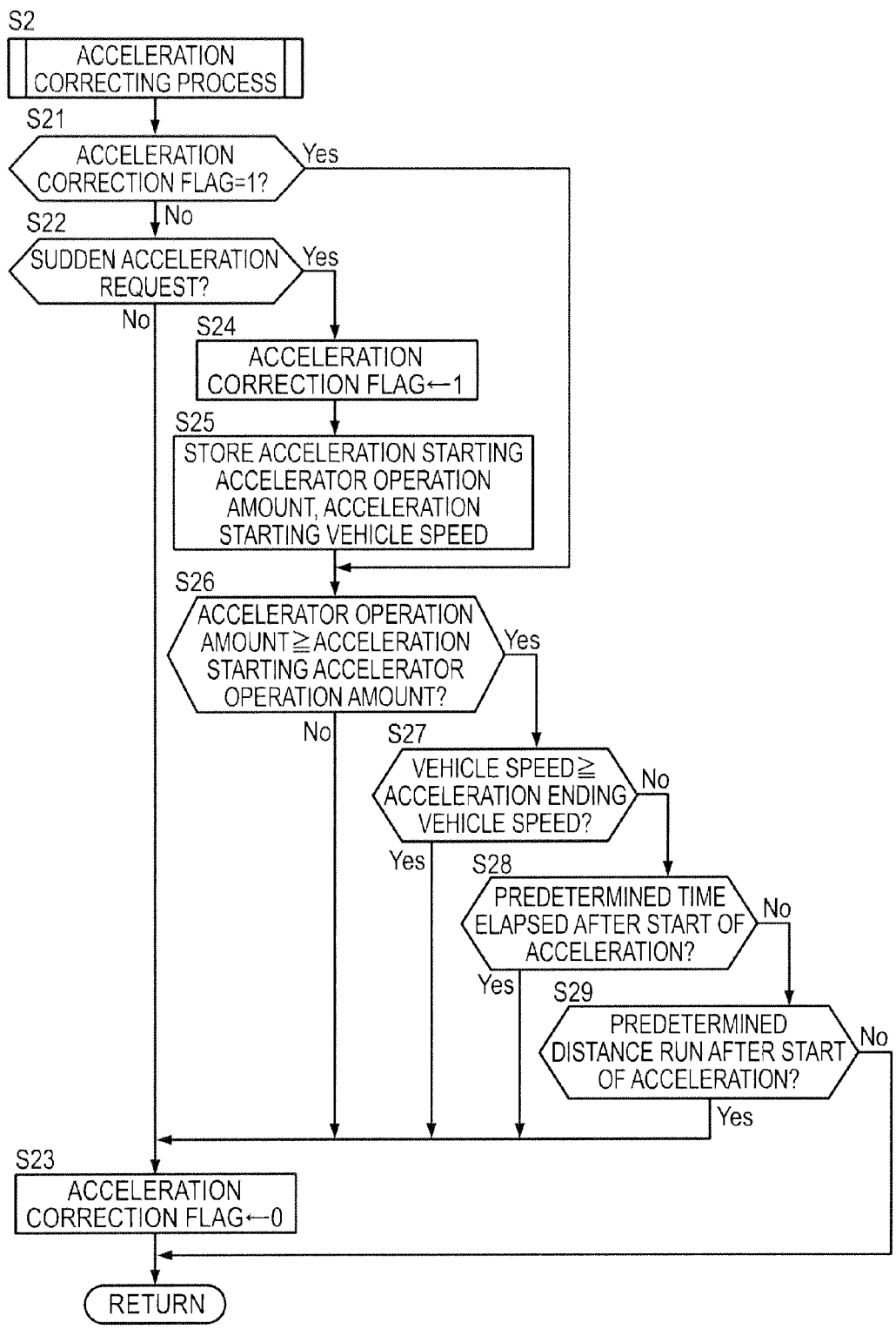
FIG. 7 is a flow chart showing an acceleration correcting process according to the first embodiment of the present invention.

FIG. 7 is a flow chart showing the acceleration correcting process.

In Step S21, the controller 5 determines whether or not an acceleration correction flag is 1. The acceleration correction flag is a flag which is set to 1 when an acceleration correction is performed and set to 0 when the acceleration correction is not performed, and is set at 0 in an initial state. The controller 5 performs the processing of Step S22 if the acceleration correction flag is 0 while performing the processing of Step S26 if the acceleration correction flag is 1.

In Step S22, the controller 5 determines whether or not to perform the acceleration correction by determining whether or not the accelerator pedal is depressed with a strong intention to accelerate, i.e. whether or not there is any sudden acceleration request. Specifically, an intention to start acceleration is confirmed by determining whether or not an accelerator operation speed indicating the accelerator operation amount per unit time is higher than a predetermined speed. The controller 5 determines the absence of the sudden acceleration request and performs the processing of Step S23 if the accelerator operation speed is not higher than the predetermined speed. On the other hand, the presence of the sudden acceleration request is determined and the processing of Step S24 is performed if the accelerator operation speed is higher than the predetermined speed.

In Step S23, the controller 5 sets the acceleration correction flag to 0.

In Step S24, the controller 5 sets the acceleration correction flag to 1.

In Step S25, the controller 5 stores the current accelerator operation amount, i.e. the accelerator operation amount when the intention to start acceleration was confirmed (hereinafter, referred to as an "acceleration starting accelerator operation amount"). Simultaneously, the current vehicle speed, i.e. the vehicle speed when the intention to start acceleration was confirmed (hereinafter, referred to as an "acceleration starting vehicle speed") is stored.

In Steps S26 to S29, whether or not to end the acceleration correction is determined.

In Step S26, the controller 5 determines whether or not the current accelerator operation amount is not smaller than the acceleration starting accelerator operation amount. The controller 5 performs the processing of Step S23 if the current accelerator operation amount is smaller than the acceleration starting accelerator operation amount. On the other hand, the processing of Step S27 is performed if the current accelerator operation amount is not smaller than the acceleration starting accelerator operation amount.

In Step S27, the controller 5 determines whether or not the current vehicle speed is not lower than a vehicle speed (hereinafter, referred to as an "acceleration ending vehicle speed") obtained by adding a predetermined vehicle speed (e.g. 50 [km/h]) to the acceleration starting vehicle speed. The controller 5 performs the processing of Step S28 if the current vehicle speed is lower than the acceleration ending vehicle speed. On the other hand, the processing of Step S23 is performed if the current vehicle speed is not lower than the acceleration ending vehicle speed.

In Step S28, the controller 5 determines whether or not a predetermined time has elapsed after the confirmation of the intention to start acceleration. The controller 5 performs the processing of Step S23 if the predetermined time has elapsed after the confirmation of the intention to start acceleration while performing the processing of Step S29 unless otherwise.

In Step S29, the controller 5 determines whether or not the vehicle has run a predetermined distance after the confirmation of the intention to start acceleration. The controller 5 performs the processing of Step S23 if the vehicle has run the predetermined distance after the confirmation of the intention to start acceleration while ending the process this time unless otherwise.

Figure 8:
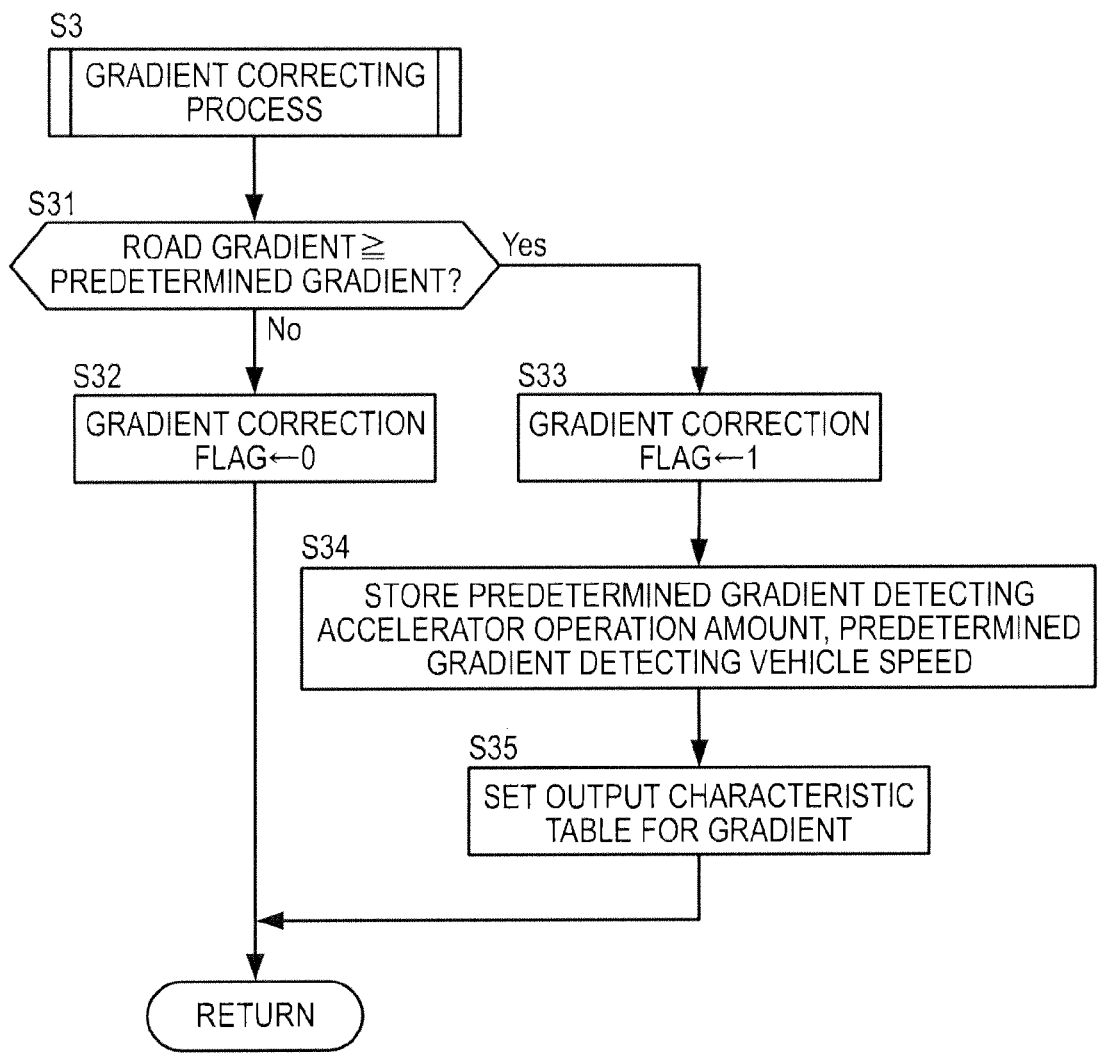
FIG. 8 is a flow chart showing a gradient correcting process according to the first embodiment of the present invention.

FIG. 8 is a flow chart showing the gradient correcting process.

In Step S31, the controller 5 determines whether or not the gradient of the road on which the vehicle is currently running is not smaller than a predetermined gradient. The controller 5 performs the processing of Step S32 if the road gradient is below the predetermined gradient while performing the processing of Step S33 unless otherwise.

In Step S32, the controller 5 sets a gradient correction flag to 0.

In Step S33, the controller 5 sets the gradient correction flag to 1.

In Step S34, the controller 5 stores the current accelerator operation amount, i.e. the accelerator operation amount when the road gradient became equal to or larger than the predetermined gradient (hereinafter, referred to as a "predetermined gradient detecting accelerator operation amount"). Simultaneously, the current vehicle speed, i.e. the vehicle speed when it was detected that the road gradient became equal to or larger than the predetermined gradient (hereinafter, referred to as a "predetermined gradient detecting vehicle speed") is stored.

In Step S35, the controller 5 sets an optimal table as an output characteristic table for gradient out of the plurality of output characteristic tables based on the current road gradient and the predetermined gradient detecting vehicle speed. Specifically, the output characteristic table for gradient is so set that the larger the road gradient and the lower the predetermined gradient detecting vehicle speed, the larger the value of the throttle opening corresponding to the accelerator operation amount. The output characteristic table for gradient is set between the solid line A and the reference line in FIG. 6.

Figure 9:
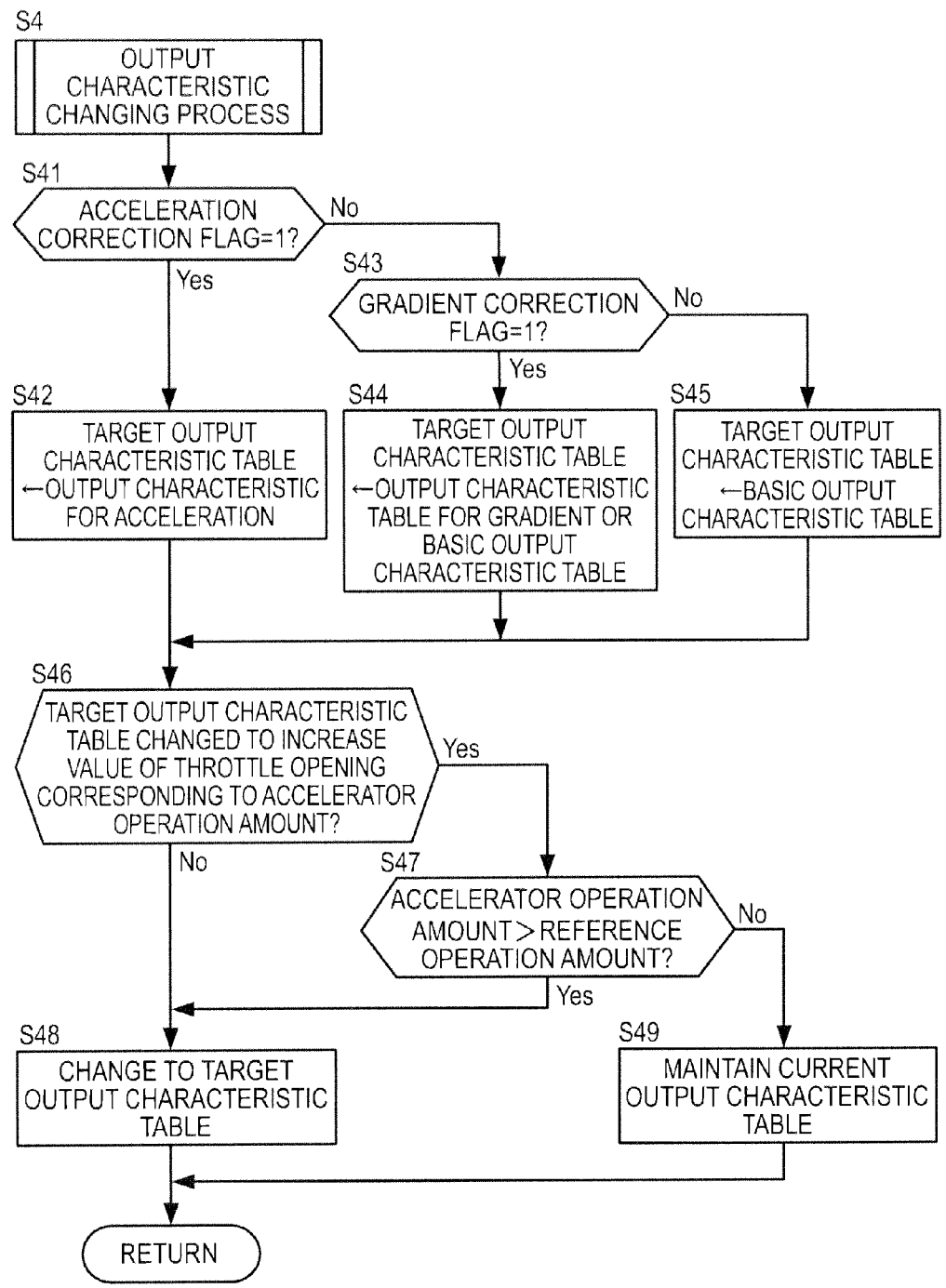
FIG. 9 is a flow chart showing an output characteristic changing process according to the first embodiment of the present invention.

FIG. 9 is a flow chart showing the output characteristic changing process.

In Step S41, the controller 5 determines whether or not the acceleration correction flag is 1. The controller 5 performs the processing of Step S42 if the acceleration correction flag is 1 while performing the processing of Step S43 unless otherwise.

In Step S42, the controller 5 selects an output characteristic table for acceleration set to maximize the value of the throttle opening corresponding to the accelerator operation amount as the target output characteristic table. The output characteristic table for acceleration is a table corresponding to the solid line A in FIG. 6.

In Step S43, the controller 5 determines whether or not the gradient correction flag is 1. The controller 5 performs the processing of Step S44 if the gradient correction flag is 1 while performing the processing of Step S45 unless otherwise.

In Step S44, the controller 5 compares the output characteristic table for gradient and the basic output characteristic table and selects the table set to have a larger value of the throttle opening corresponding to the accelerator operation amount as the target output characteristic table.

In Step S45, the controller 5 selects the basic output characteristic table as the target output characteristic table.

In Steps S46 and S47, whether or not to actually change the output characteristic table to the target output characteristic table is determined.

In Step S46, the controller 5 compares the currently selected output characteristic and the target output characteristic. Then, it is determined whether the target output characteristic table is a table set to have a larger value of the throttle opening corresponding to the accelerator operation amount than the currently selected output characteristic table. That is, it is determined whether or not the throttle opening calculated by referring to the target output characteristic table is larger than the one calculated by referring to the currently selected output characteristic table if the accelerator operation amount is the same. The controller 5 performs the processing of Step S47 if the target output characteristic table is a table set to have a larger value of the throttle opening corresponding to the accelerator operation amount than the currently selected output characteristic table while performing the processing of Step S48 unless otherwise.

In Step S47, the controller 5 determines whether or not the accelerator operation amount is larger than a reference operation amount. At this time, if the output characteristic table for acceleration is selected as the target output characteristic table, the acceleration starting accelerator operation amount is set as the reference operation amount. If the output characteristic table for gradient is selected as the target output characteristic table, the predetermined gradient detecting accelerator operation amount is set as the reference operation amount. If the basic output characteristic table is selected as the target output characteristic table, the accelerator operation amount when the basic output characteristic table was set is set as the reference operation amount.

Such determinations are made in Steps S46 and S47 because an engine output may suddenly increase and the vehicle may accelerate against the driver's intention if the output characteristic table is changed to a table set to have a larger value of the throttle opening corresponding to the accelerator operation amount than the current value in a state where the accelerator operation amount is maintained constant.

In Step S48, the controller 5 changes the output characteristic table from the currently selected one to the target output characteristic table.

In Step S49, the controller 5 maintains the currently selected output characteristic table and prohibits a change to the target output characteristic table.

Figure 10:
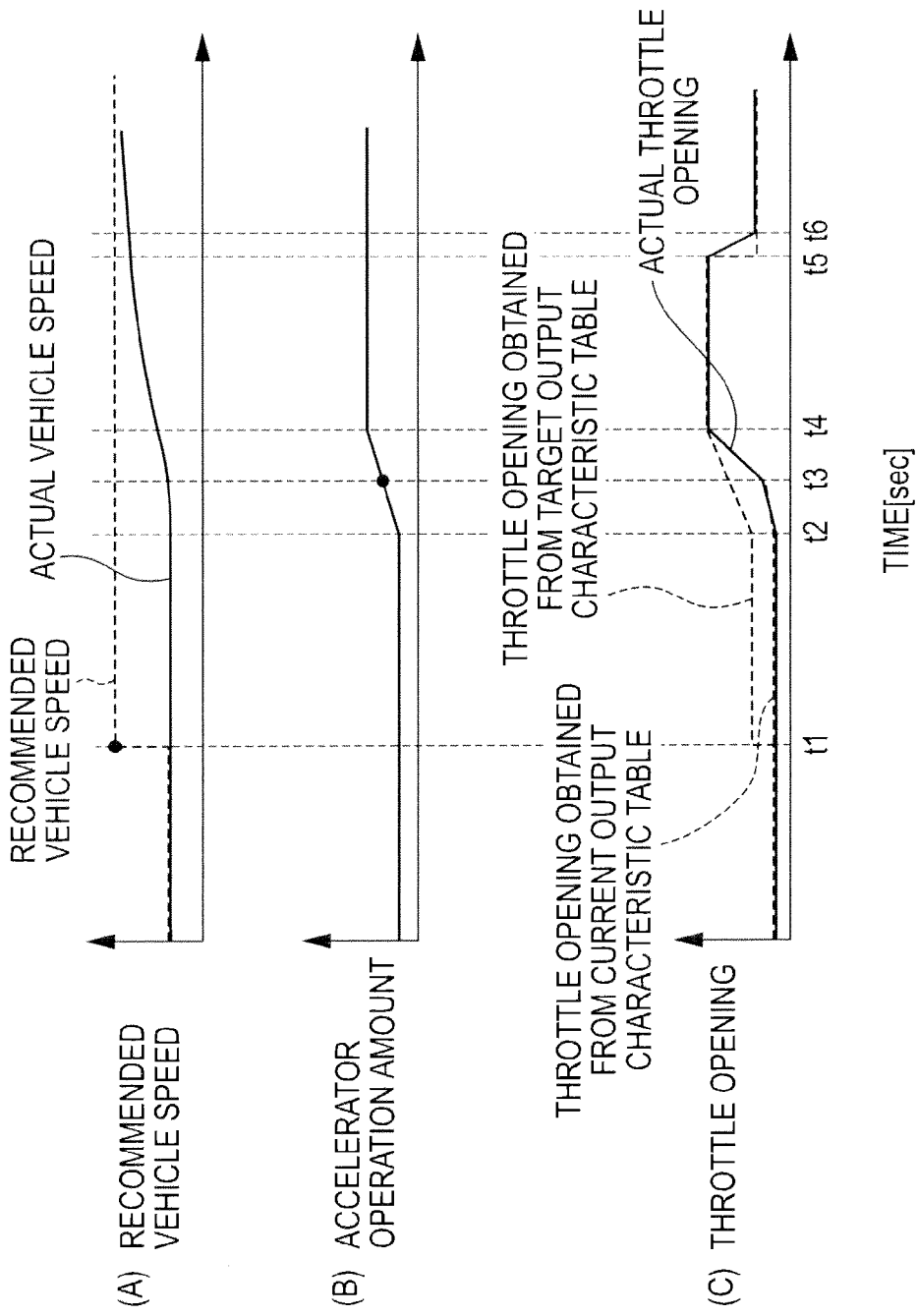
FIG. 10 is a time chart showing the operation of the output characteristic control according to the first embodiment of the present invention.

FIG. 10 is a time chart showing the operation of the output characteristic control when the acceleration correction flag and the gradient correction flag are 0.

When the vehicle speed difference between the recommended vehicle speed and the own-vehicle speed increases (FIG. 10(A)) and the basic target acceleration becomes relatively large at time t1, a table having a larger value of the throttle opening corresponding to the accelerator operation amount than the currently selected output characteristic table is set as the basic output characteristic table (S18). Since the acceleration correction flag and the gradient correction flag are 0, this basic output characteristic table is selected as the target output characteristic table (FIG. 10(C); No in S41, No in S43, S45).

The table having the larger throttle opening corresponding to the accelerator operation amount than the currently selected output characteristic table is selected as the target output characteristic table from time t1 to time t2 (FIG. 10(C)). Further, the accelerator operation amount is kept constant (FIG. 10(B)). Thus, the throttle opening is determined based on the accelerator operation amount by referring to the currently selected output characteristic table (FIG. 10(C); Yes in S46, No in S47, S49).

When the accelerator pedal is depressed at time t2 (FIG. 10(B)) and the accelerator operation amount is detected to be larger than the reference operation amount (here, accelerator operation amount when the basic output characteristic table was set, i.e. accelerator operation amount at time t1) at time t3 (FIG. 10(B)), the output characteristic table is changed from the currently selected output characteristic table to the target output characteristic table (FIG. 10(C); Yes in S46, Yes in S47, S48).

It should be noted that the throttle opening is gradually changed to the throttle opening calculated by referring to the target output characteristic table when the currently selected output characteristic table is changed to the target output characteristic table (FIG. 10(C); time t3 to time t4). This can prevent the deterioration of drivability associated with a sudden change of the throttle opening.

At this time, if the acceleration correction flag is 1, a time for changing the throttle opening to the throttle opening calculated by referring to the target output characteristic table may be made shorter than the one when the acceleration correction flag is 0. In this way, it can be suppressed that the driver excessively depresses the accelerator pedal during acceleration and fuel economy can be improved by increasing a response speed of the engine 1 to the accelerator operation when the driver has an intention to accelerate.

If the vehicle speed difference between the recommended vehicle speed and the own-vehicle speed becomes smaller (FIG. 10(A)) and the basic target acceleration becomes relatively smaller at time t5, a table having a smaller value of the throttle opening corresponding to the accelerator operation amount than the currently selected output characteristic table is set as the basic output characteristic table (S18). Since the acceleration correction flag and the gradient correction flag are 0, this basic output characteristic table is selected as the target output characteristic table (FIG. 10(C); No in S41, No in S43, S45).

Further, since the table having the smaller throttle opening corresponding to the accelerator operation amount than the currently selected output characteristic table is selected as the target output characteristic table, the output characteristic table is changed from the currently selected output characteristic table at this point of time (time t5) to the target output characteristic table (FIG. 10(C); No in S46, S48). Then, the throttle opening is gradually changed to the throttle opening calculated by referring to the target output characteristic table (FIG. 10(C); time t5 to time t6).

Figure 11:
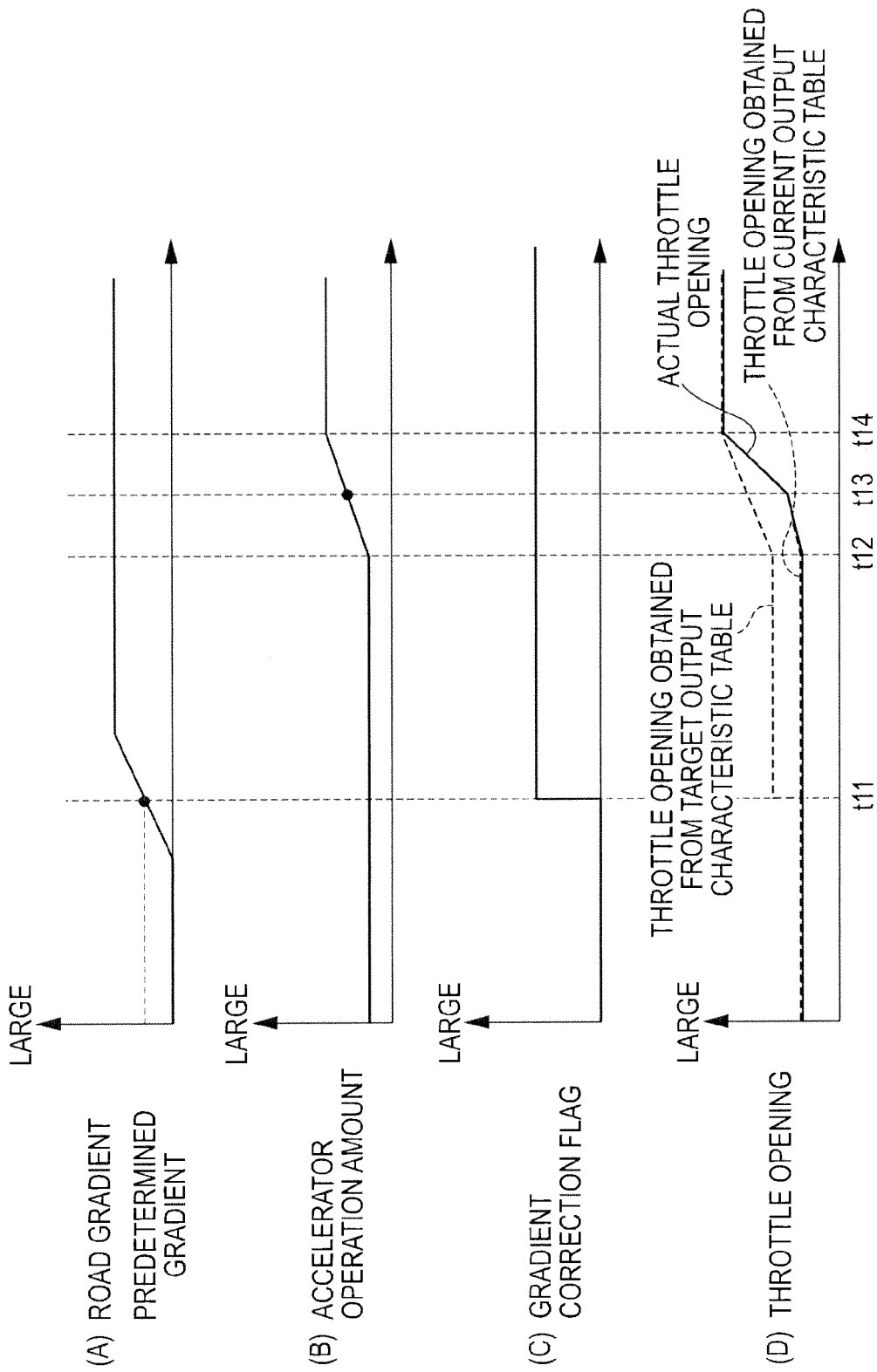
FIG. 11 is a time chart showing the operation of the output characteristic control according to the first embodiment of the present invention.

FIG. 11 is a time chart showing the operation of the output characteristic control when the acceleration correction flag is 0. It should be noted that the recommended vehicle speed remains unchanged.

When an actual gradient becomes larger than the predetermined gradient (FIG. 11(A); Yes in S31) at time t11, the gradient correction flag is set to 1 (FIG. 11(C); S33) and the output characteristic table for gradient is set based on the actual gradient and the own-vehicle speed (S35). Since the recommended vehicle speed remains unchanged and the accelerator operation amount is also constant here, the throttle opening corresponding to the accelerator operation amount is larger in the output characteristic table for gradient than in the basic output characteristic table.

Since the acceleration correction flag is 0 and the throttle opening corresponding to the accelerator operation amount is larger in the output characteristic table for gradient than in the basic output characteristic table, the output characteristic table for gradient is set as the target output characteristic table (No in S41, Yes in S43, S44).

When the accelerator pedal is depressed at time t12 and the accelerator operation amount is detected to be larger than the reference operation amount (here, predetermined gradient detecting accelerator operation amount, i.e. accelerator operation amount at time t11) at time t13 (FIG. 11(B)), the output characteristic table is changed from the currently selected output characteristic table to the target output characteristic table (FIG. 11(D); Yes in S46, Yes in S47, S48). Then, the throttle opening is gradually changed to the throttle opening calculated by referring to the target output characteristic table (FIG. 11(D); time t13 to time t14).

According to the present embodiment described above, the recommended vehicle speed at which the own vehicle can comfortably and fuel-efficiently run is calculated based on the road traffic environment judged from the navigation information and the inter-vehicle distance. Then, an engine output characteristic is controlled to a characteristic in which the own vehicle easily runs at this recommended vehicle speed.

Specifically, when the recommended vehicle speed is switched during running and the vehicle speed difference between the recommended vehicle speed and the own-vehicle speed becomes relatively large, an engine output characteristic of being easy to accelerate is set by increasing the throttle opening corresponding to the accelerator operation amount. As the vehicle speed difference between the recommended vehicle speed and the own-vehicle speed decreases, i.e. as the own-vehicle speed approaches the recommended vehicle speed, a change is made to an engine output characteristic of being difficult to accelerate by gradually reducing the throttle opening corresponding to the accelerator operation amount.

If the recommended vehicle speed is switched during running, the driver is thought to basically adjust the vehicle speed toward the recommended vehicle speed. However, if the driver is inexperienced in driving technique, the driver may excessively depress the accelerator pedal in adjusting the vehicle speed to the recommended vehicle speed and return the accelerator pedal to adjust the vehicle speed toward the recommended vehicle speed after the vehicle speed exceeds the recommended vehicle speed. If this occurs, the vehicle unnecessarily accelerates, wherefore fuel economy is deteriorated.

As just described, depending on the driving technique of the driver, the accelerator pedal may be depressed more than necessary to accelerate the vehicle and fuel economy may be deteriorated when the vehicle speed is adjusted toward the recommended vehicle speed. Thus, fuel economy varies due to differences in driving technique among drivers.

Accordingly, an engine output characteristic of being difficult to accelerate is gradually set by gradually reducing the throttle opening corresponding to the accelerator operation amount as the own-vehicle speed approaches the recommended vehicle speed as in the present embodiment, whereby it can be suppressed that the vehicle accelerates more than necessary even if the driver depresses the accelerator pedal more than necessary. In this way, a variation in fuel economy caused by differences in driving technique among drivers can be suppressed and fuel economy can be improved regardless of the driving technique of the driver.

Further, by gradually reducing the throttle opening corresponding to the accelerator operation amount as the own-vehicle speed approaches the recommended vehicle speed, a change in throttle opening in relation to a change in accelerator operation amount can be made smaller (reduce the response speed of the engine 1). This can suppress the fluctuation of the vehicle speed when a rough accelerator operation is performed in the vicinity of the recommended vehicle speed. Thus, constant speed running at the recommended vehicle speed suitable for the road traffic environment becomes easier, wherefore fuel economy can be improved.

Further, since the engine output characteristic corresponding to the accelerator operation amount is changed according to the vehicle speed difference between the recommended vehicle speed and the own-vehicle speed, an accelerator operation by the driver in accelerating the vehicle toward the recommended vehicle speed can be suppressed. That is, it is possible to reduce the accelerator operation amount by the driver when the vehicle is accelerated toward the recommended vehicle speed in a scene where the recommended vehicle speed is switched and to reduce a difference between the accelerator operation amount before the recommended vehicle speed is switched and the accelerator operation amount after the recommended vehicle speed is switched. In this way, the excessive depression of the accelerator pedal by the driver during acceleration can be suppressed and fuel economy can be improved.

Further, according to the present embodiment, the output characteristic is changed to the output characteristic for acceleration for relatively increasing the throttle opening corresponding to the accelerator operation amount (increase the response speed of the engine 1) if there is a strong acceleration request. In this way, the driver's strong acceleration request can be responded and the excessive depression of the accelerator pedal by the driver during acceleration can be suppressed. Therefore, fuel economy can be improved while drivability is ensured.

The engine output characteristic is changed according to the vehicle speed difference between the recommended vehicle speed and the own-vehicle speed after a predetermined condition holds (the vehicle speed has increased by a predetermined amount, a predetermined time has elapsed or a predetermined distance has been run after the start of acceleration) after a strong acceleration request. This can improve fuel economy while suppressing unnecessary acceleration.

Further, according to the present embodiment, the output characteristic is changed according to the actual gradient. Specifically, a throttle characteristic is set such that the larger the actual gradient, the larger the throttle opening corresponding to the accelerator operation amount.

If being inexperienced in driving technique, the driver may excessively depress the accelerator pedal to unnecessarily accelerate the vehicle without being able to adjust well when adjusting the vehicle speed according to a change in the actual gradient.

Accordingly, by changing the engine output characteristic according to the actual gradient as in the present embodiment, an increase in the depression amount of the accelerator pedal by the driver can be reduced. Thus, fuel economy can be improved by suppressing unnecessary acceleration.

Further, according to the present embodiment, the output characteristic table is changed to the one having a larger value of the throttle opening corresponding to the accelerator operation amount than the current value after an increase in the accelerator operation amount is detected. This can prevent the vehicle from accelerating against the driver's intention by preventing the engine output from being increased although no accelerator operation is performed.

Further, according to the present embodiment, the throttle opening is gradually changed to the throttle opening calculated by referring to the target output characteristic table when the output characteristic table is changed to the target output characteristic table. This can prevent the deterioration of drivability associated with a sudden change in the throttle opening.

Second Embodiment

Next, a second embodiment of the present invention is described. The second embodiment of the present embodiment differs from the first embodiment in that a gain of a throttle opening corresponding to an accelerator operation amount is calculated and an engine output characteristic is changed based on that gain. The following description is centered on that point of difference. It should be noted that parts fulfilling functions similar to those of the first embodiment are denoted by the same reference signs and repeated description is appropriately omitted in each of embodiments described below.

Figure 12:
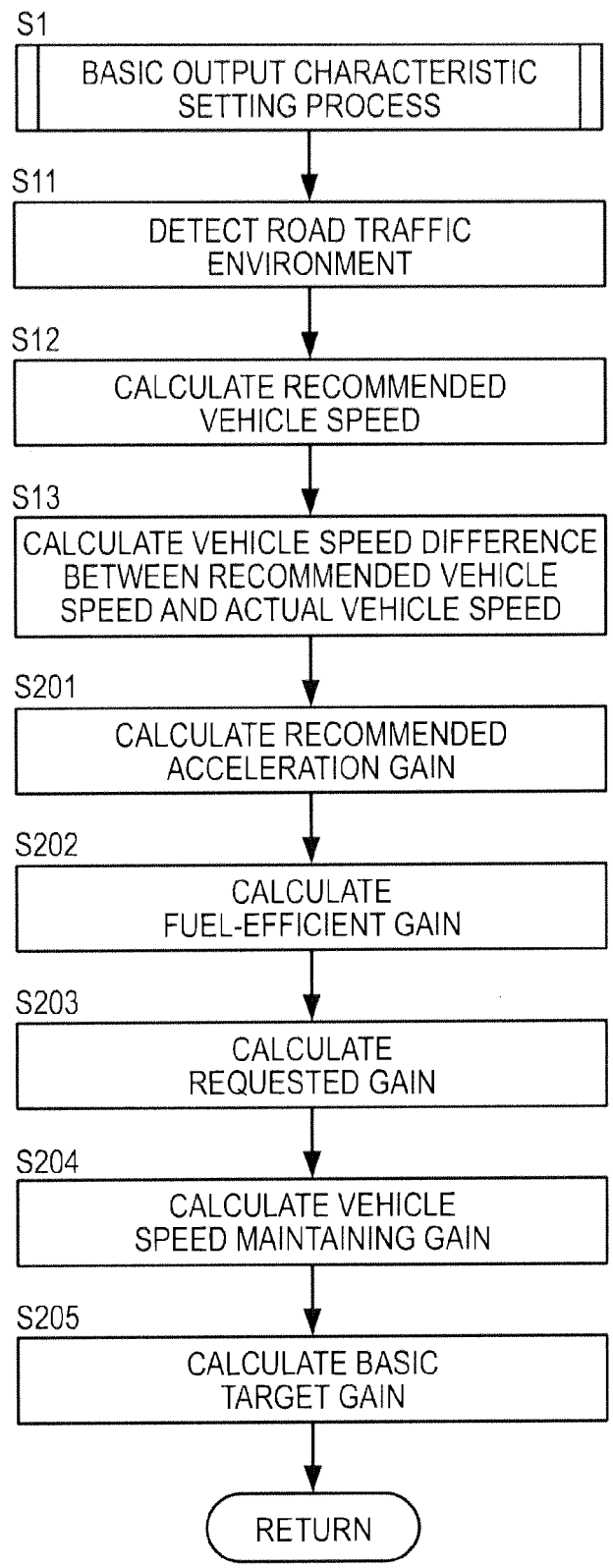
FIG. 12 is a flow chart showing a basic output characteristic setting process according to a second embodiment of the present invention.

FIG. 12 is a flow chart showing a basic output characteristic setting process according to the present embodiment.

Figure 13:
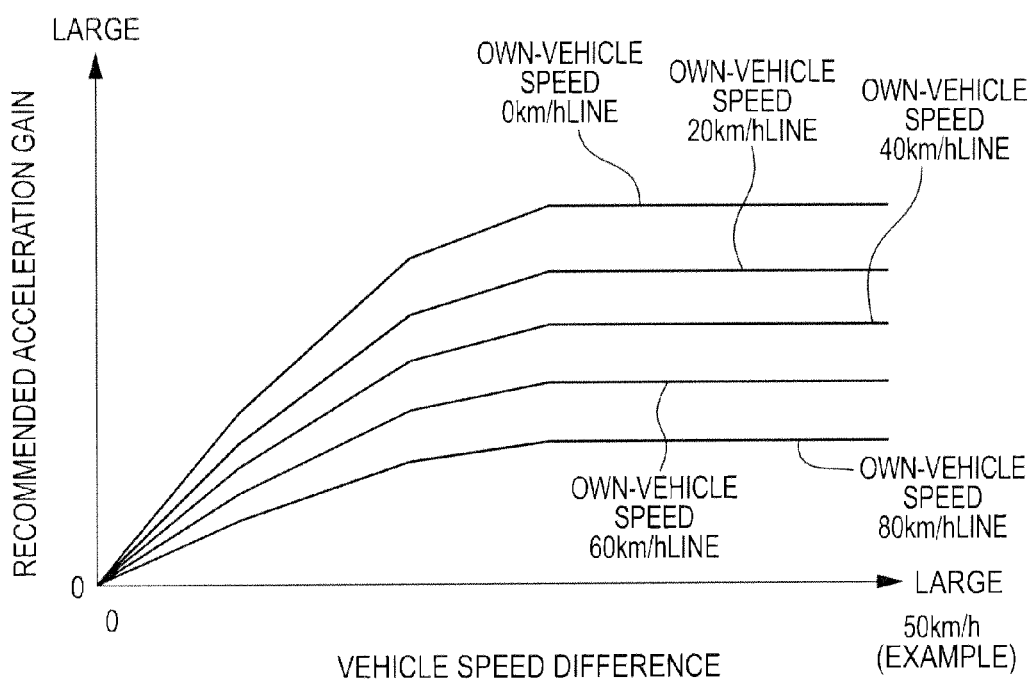
FIG. 13 is a map for calculating a recommended acceleration gain based on a vehicle speed difference and an actual vehicle speed.

In Step S201, a controller 5 refers to a map of FIG. 13 specified by an experiment or the like in advance and calculates a gain for setting an output characteristic of an engine 1 to a characteristic suitable for accelerating a vehicle toward a recommended vehicle speed (hereinafter, referred to as a "recommended acceleration gain") based on a vehicle speed difference and an own-vehicle speed. As shown in the map of FIG. 13, the recommended acceleration gain becomes smaller as the vehicle speed difference becomes smaller, i.e. as the own-vehicle speed approaches the recommended vehicle speed. Further, the recommended acceleration gain is larger when the own-vehicle speed is low than when the own-vehicle speed is high.

Figure 14:
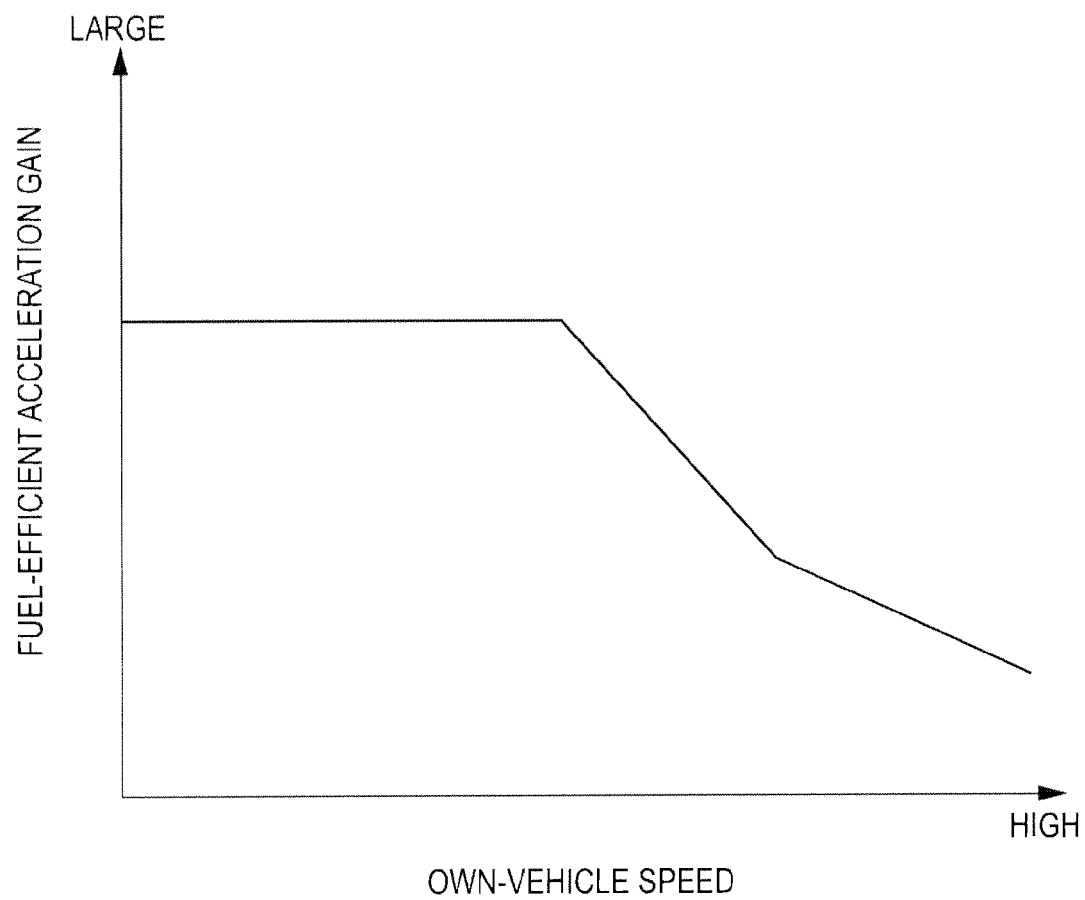
FIG. 14 is a table for calculating a fuel-efficient acceleration gain based on the actual vehicle speed.

In Step S202, the controller 5 refers to a table of FIG. 14 specified by an experiment or the like in advance and calculates a gain for setting the output characteristic of the engine 1 to a characteristic suitable for fuel-efficiently accelerating the vehicle (hereinafter, referred to as a "fuel-efficient acceleration gain") based on the own-vehicle speed. As shown in the map of FIG. 14, the fuel-efficient acceleration gain is constant until the own-vehicle speed reaches a predetermined vehicle speed and gradually becomes smaller after the own-vehicle speed exceeds the predetermined vehicle speed.

In Step S203, the controller 5 refers to a map specified by an experiment or the like in advance and calculates a gain for setting the output characteristic of the engine 1 to a characteristic suitable for generating an acceleration requested by the driver (hereinafter, referred to as a "requested gain") based on the accelerator operation amount and the own-vehicle speed.

Figure 15:
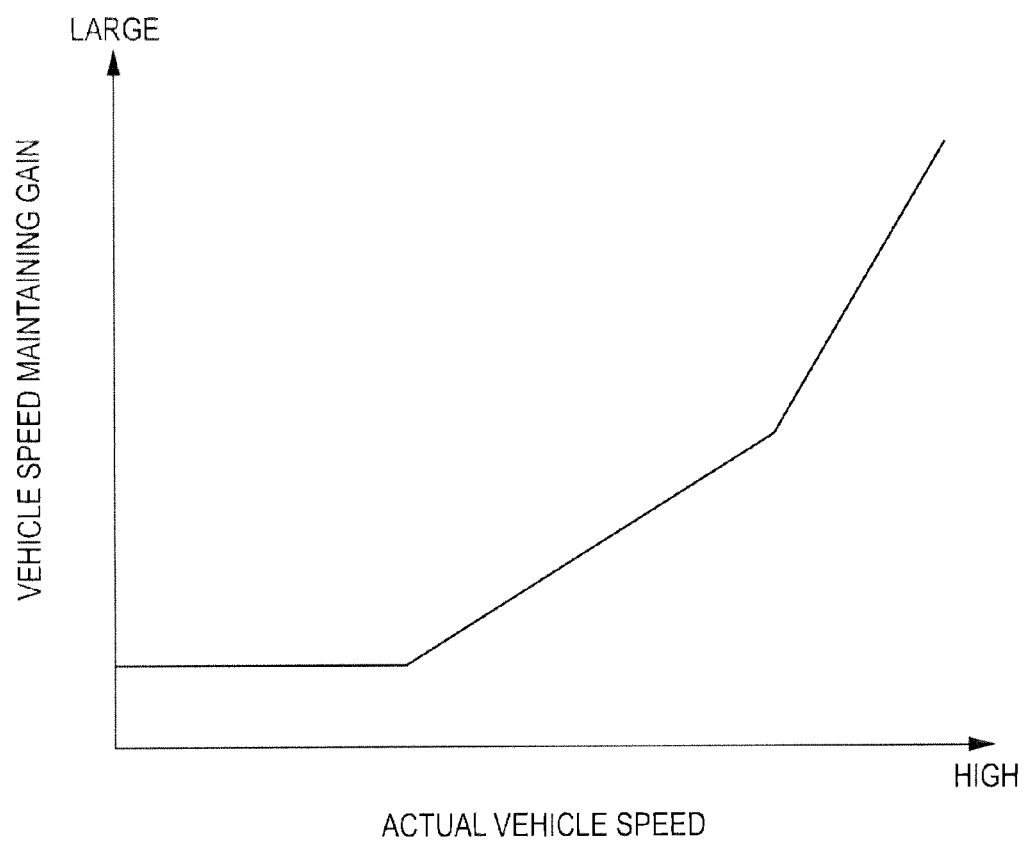
FIG. 15 is a table for calculating a vehicle speed maintaining gain based on the actual vehicle speed.

In Step S204, the controller 5 refers to a table of FIG. 15 specified by an experiment or the like in advance and calculates a gain for setting the output characteristic of the engine 1 to a characteristic in which the current vehicle speed is easily maintained (hereinafter, referred to as a "vehicle speed maintaining gain") based on the own-vehicle speed. As shown in the map of FIG. 15, the vehicle speed maintaining gain increases as the own-vehicle speed increases.

In Step S205, the controller 5 calculates a basic target gain. Specifically, the recommended acceleration gain and the fuel-efficient acceleration gain are compared and the smaller one is set as a provisional target gain. Then, the provisional target gain, the requested gain and the vehicle speed maintaining gain are respectively compared and the largest one is set as the basic target gain.

Figure 16:
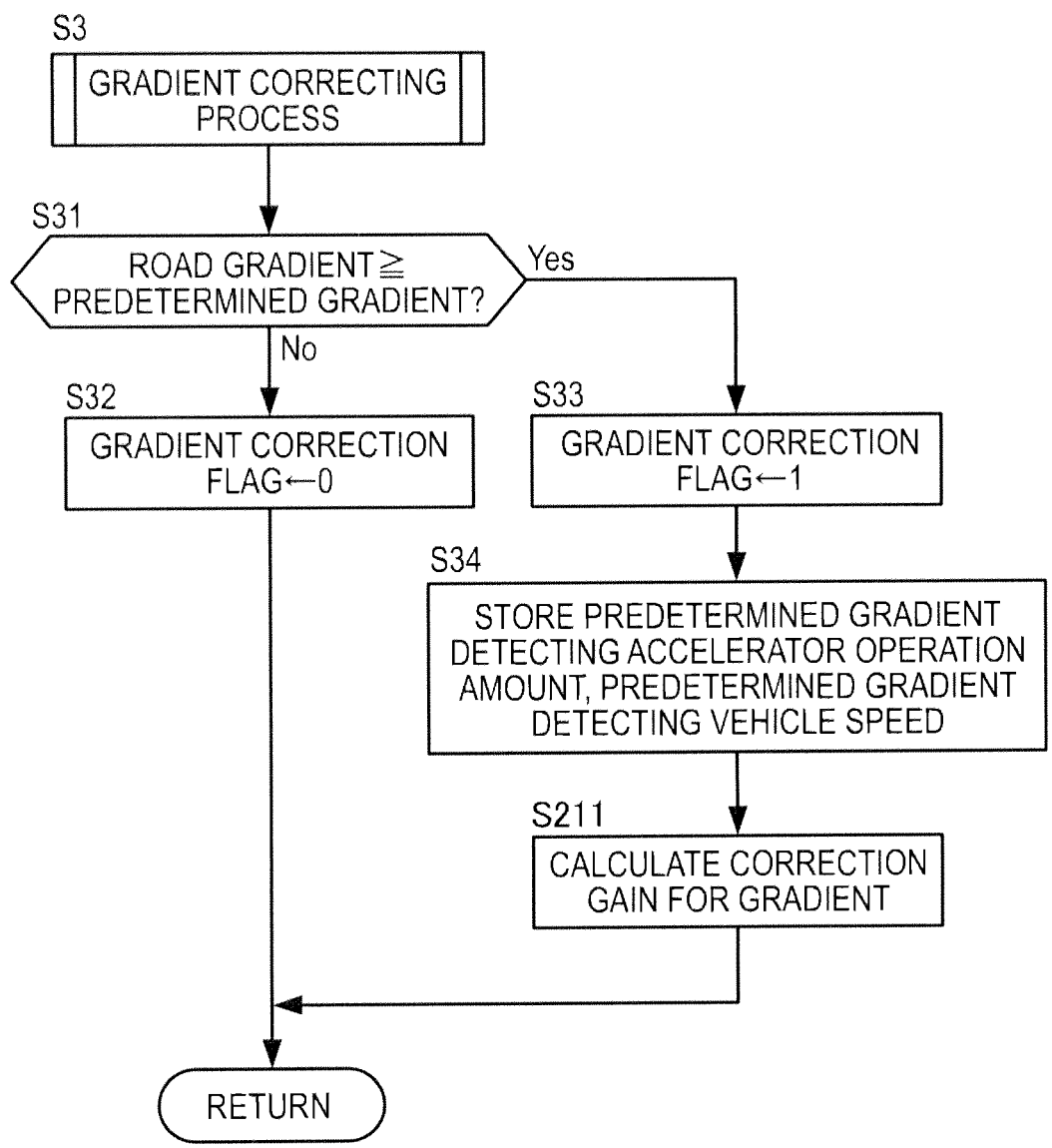
FIG. 16 is a flow chart showing a gradient correcting process according to the second embodiment of the present invention.

FIG. 16 is a flow chart showing a gradient correcting process according to the present embodiment.

In Step S211, the controller 5 calculates a correction gain for gradient based on the current road gradient and a predetermined gradient detecting vehicle speed. The correction gain for gradient is set to increase as the road gradient increases and the predetermined gradient detecting vehicle speed decreases.

Figure 17:
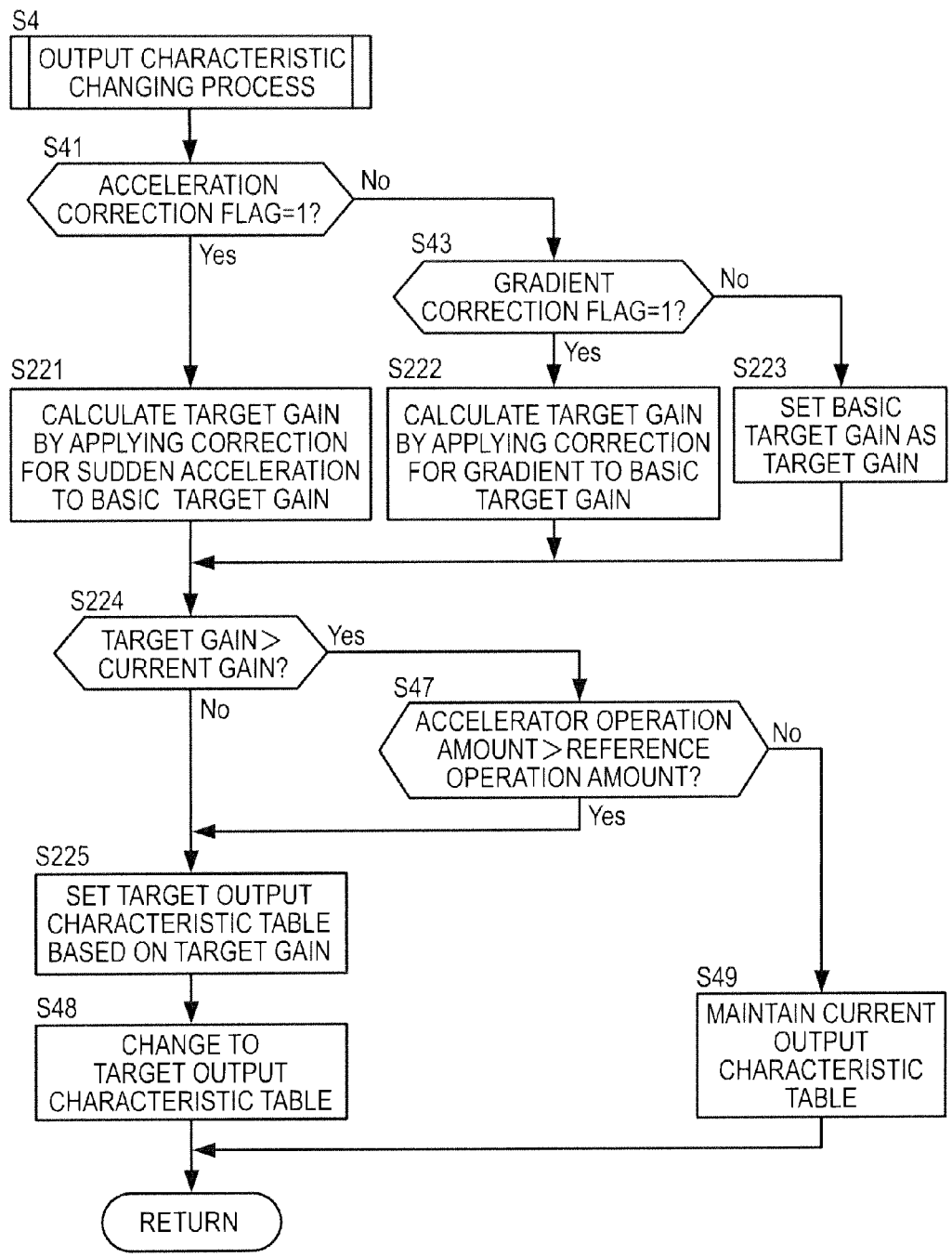
FIG. 17 is a flow chart showing an output characteristic changing process according to the second embodiment of the present invention.

FIG. 17 is a flow chart showing an output characteristic changing process according to the present embodiment.

In Step S221, the controller 5 calculates a target gain by applying a correction for sudden acceleration to the basic target gain. Specifically, the target gain is set by applying a correction for increasing up to a maximum value settable as a gain to the basic target gain.

In Step S222, the controller 5 calculates a target gain by applying a correction for gradient to the basic target gain. Specifically, the target gain is set by adding the correction gain for gradient to the basic target gain.

In Step S223, the controller 5 sets the basic target gain as the target gain.

In Step S224, the controller 5 determines whether or not the target gain is larger than the current gain. The controller 5 performs the processing of Step S47 if the target gain is larger than the current gain while performing the processing of Step S225 unless otherwise.

In Step S225, the controller 5 sets a target output characteristic table based on the target gain.

Figure 18:
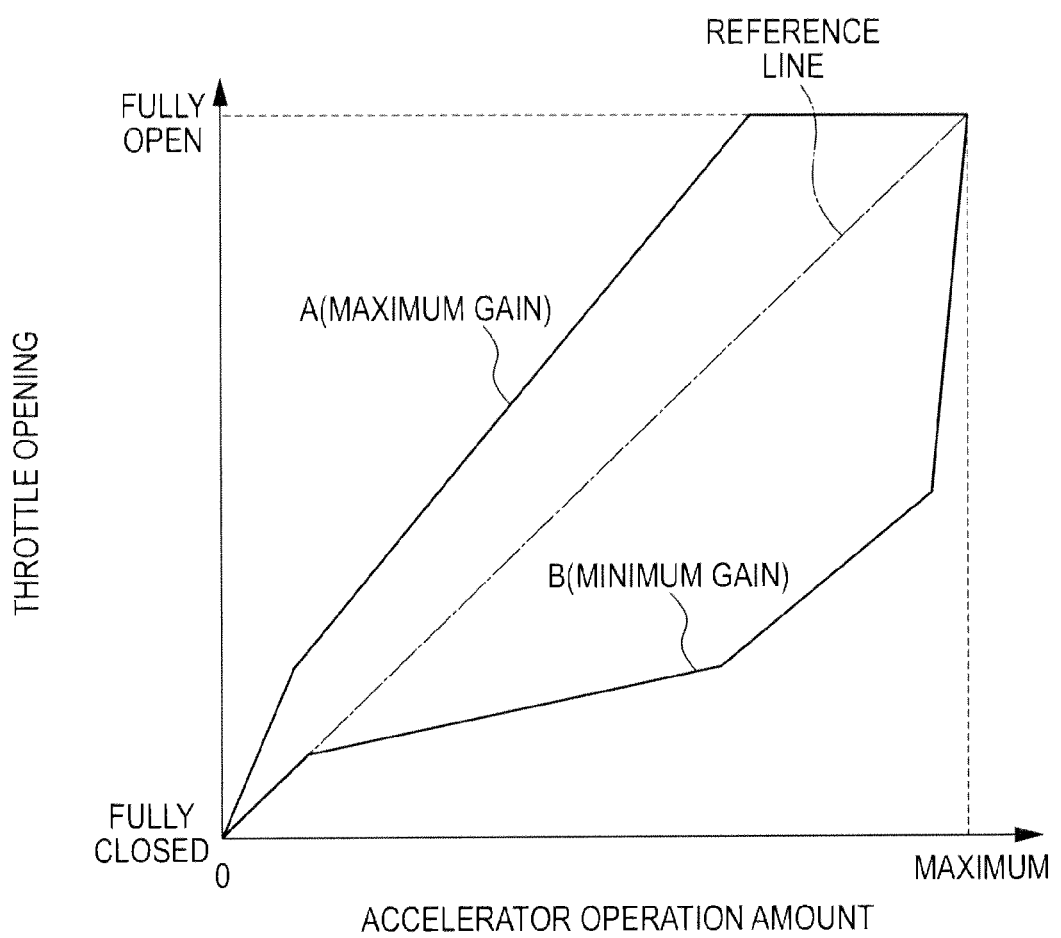
FIG. 18 is a graph showing a method for setting a target output characteristic table according to the second embodiment of the present invention.

FIG. 18 is a graph showing a method for setting the target output characteristic table according to the present embodiment.

As shown in FIG. 18, a solid line A represents the target output characteristic table set when the target gain is maximum. A solid line B represents the target output characteristic table set when the target gain is minimum. In the present embodiment, the target output characteristic table is appropriately set between the solid lines A and B based on the set target gain.

According to the present embodiment described above, functions and effects similar to those of the first embodiment described above can be obtained.

Third Embodiment

Next, a third embodiment of the present invention is described. The third embodiment of the present embodiment differs from the first embodiment in that such an output characteristic table as to reduce the value of a throttle opening corresponding to an accelerator operation amount is set when a downward road gradient increases. The following description is centered on that point of difference.

In the gradient correcting process of the first embodiment, the output characteristic of the engine 1 is changed only when the road gradient becomes equal to or larger than the predetermined gradient, i.e. when the own vehicle is running on an uphill.

However, the vehicle is particularly likely to accelerate when running on a downhill. Thus, also when the own vehicle is running on a downhill, a driver may excessively depress the accelerator pedal to unnecessarily accelerate the vehicle without being able to adjust well if being inexperienced in driving technique.

Accordingly, in the present embodiment, the output characteristic of the engine 1 is changed also when the road gradient becomes equal to or smaller than a predetermined downward gradient, i.e. when the own vehicle is running on a downhill. Specifically, an output characteristic table for downward gradient suitable for downhill running is set as the output characteristic table when the road gradient becomes equal to or smaller than the predetermined downward gradient.

Figure 19:
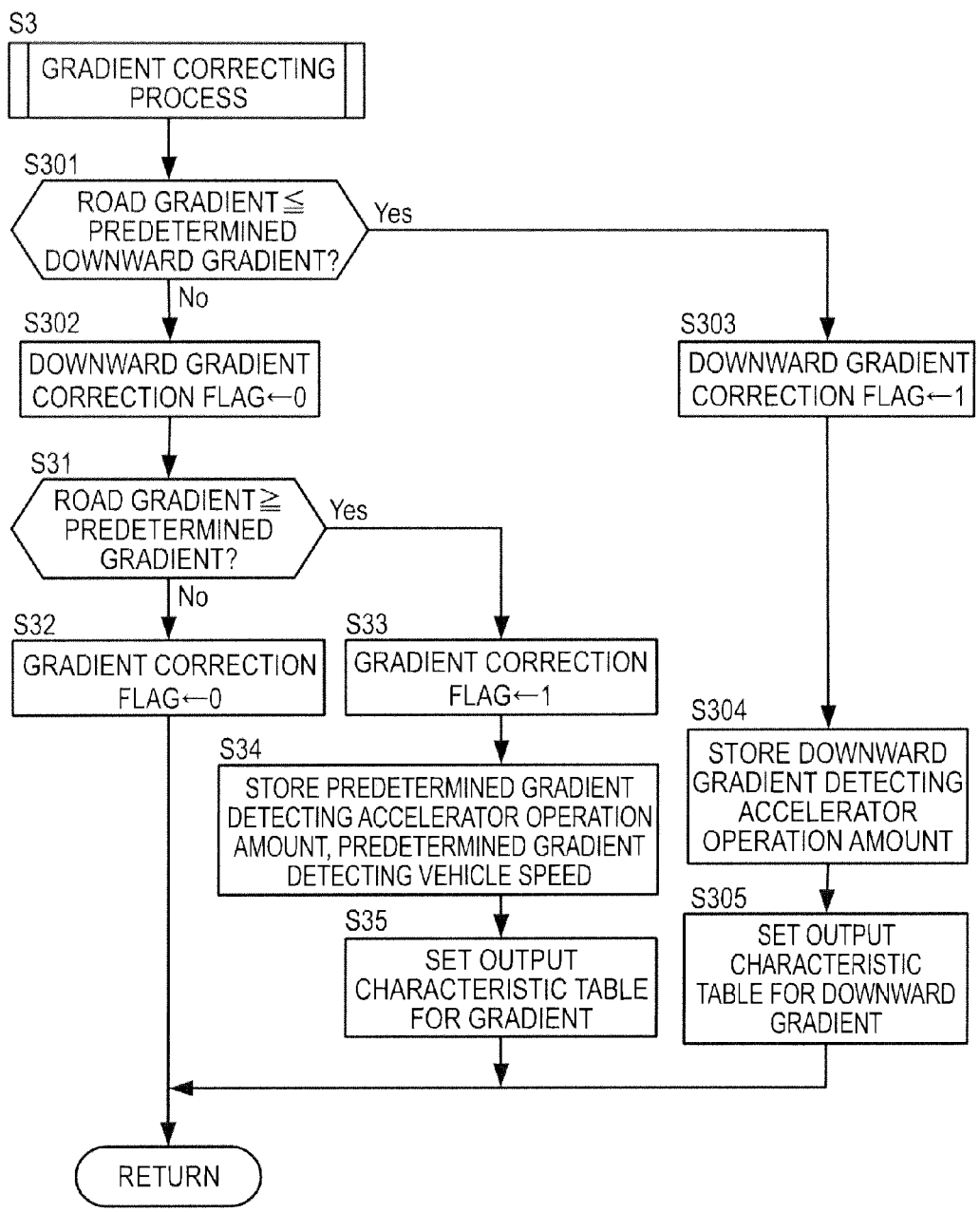
FIG. 19 is a flow chart showing a gradient correcting process according to a third embodiment of the present invention.

FIG. 19 is a flow chart showing the gradient correcting process according to the present embodiment.

In Step S301, the controller 5 determines whether or not the own vehicle is running on a downhill. Specifically, whether or not the road gradient is not larger than the predetermined downward gradient is determined. It should be noted that the predetermined downward gradient is a negative value. The controller 5 performs the processing of Step S302 if the own vehicle is not running on a downhill, i.e. if the road gradient is larger than the predetermined gradient. On the other hand, the processing of Step S303 is performed if the own vehicle is running on a downhill, i.e. if the road gradient is not larger than the predetermined gradient.

In Step S302, the controller 5 sets a downward gradient correction flag to 0. The downward gradient correction flag is a flag which is set to 1 during downhill running and set to 0 when the vehicle is not running on a downhill, and is set at 0 in an initial state.

In Step S303, the controller 5 sets the downward gradient correction flag to 1.

In Step S304, the controller 5 stores the current accelerator operation amount, i.e. accelerator operation amount when the road gradient became equal to or smaller than the predetermined downward gradient (hereinafter, referred to as a "downward gradient detecting accelerator operation amount").

In Step S305, the controller 5 sets an output characteristic table for downward gradient based on the current road gradient.

Figure 20:
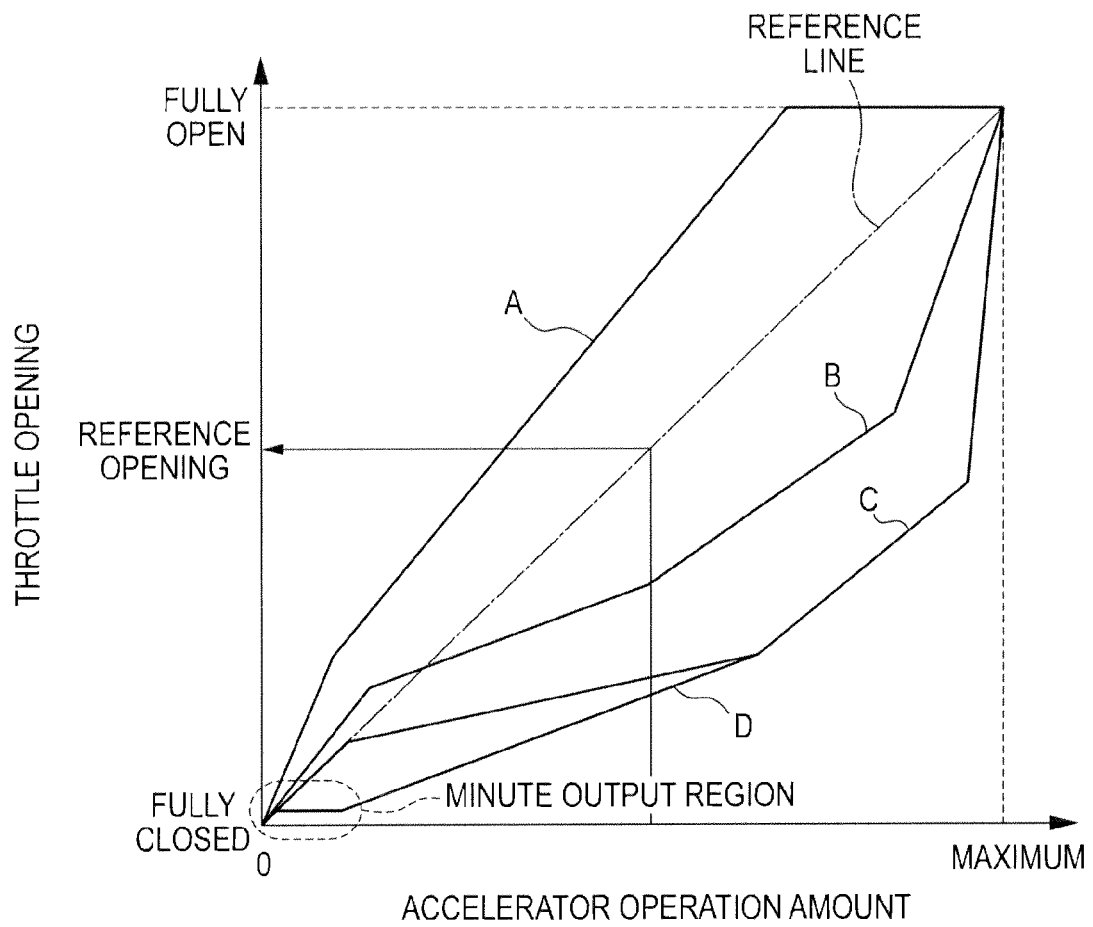
FIG. 20 is a graph showing an output characteristic table for downward gradient according to the third embodiment of the present invention.

FIG. 20 is a graph showing the output characteristic table for downward gradient according to the present embodiment.

In the first embodiment, the solid line C is set as an output characteristic table having a smallest throttle opening corresponding to the accelerator operation amount and the output characteristic of the engine 1 is changed by appropriately changing the output characteristic table between the solid lines A and C.

Contrary to this, in the present embodiment, an output characteristic table having an even smaller value of the throttle opening corresponding to the accelerator operation amount than the output characteristic table shown by the solid line C is set as the output characteristic table for downward gradient when the road gradient becomes equal to or smaller than the predetermined downward gradient.

A solid line D shows an example of the output characteristic table for downward gradient. When the road gradient becomes equal to or smaller than the predetermined downward gradient, the output characteristic table for downward gradient is set between the solid lines C and D according to the road gradient.

As just described, when the own vehicle is running on a downhill, such an engine output characteristic that the vehicle is unlikely to accelerate even if the accelerator pedal is depressed is set by reducing the value of the throttle opening corresponding to the accelerator operation amount. This can suppress that the vehicle is accelerated more than necessary during downhill running.

Further, since the vehicle is particularly likely to accelerate during downhill running, if the driver is inexperienced in driving technique, the driver may excessively depress the accelerator pedal and cannot adjust the vehicle speed well when he wants to accelerate only a little in a state where the vehicle is running on a downhill by using engine brake without depressing the accelerator pedal.

Accordingly, in the present embodiment, a minute output region where an output of the engine 1 is held at a predetermined minute output when the accelerator operation amount is small is provided in the output characteristic table for downward gradient as shown in a part enclosed by broken line in FIG. 20. The minute output is such an output capable of releasing an idle state and is an engine output slightly higher than an engine output necessary to maintain the idle state.

This enables the vehicle speed to be easily adjusted when it is desired to accelerate by depressing the accelerator pedal only a little in the state where the vehicle is running on a downhill by using engine brake without depressing the accelerator pedal.

Figure 21:
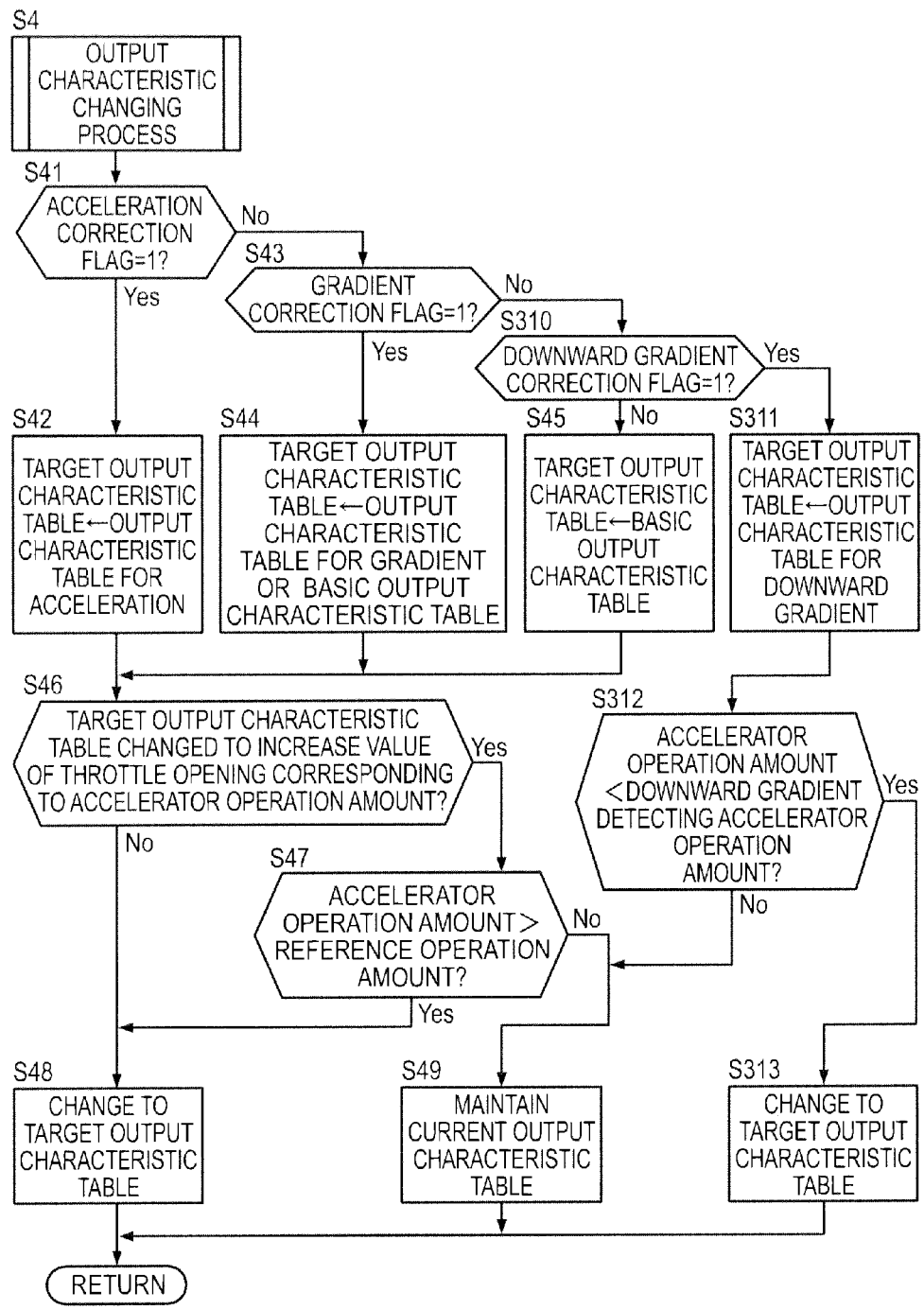
FIG. 21 is a flow chart showing an output characteristic changing process according to the third embodiment of the present invention.

FIG. 21 is a flow chart showing an output characteristic changing process according to the present embodiment.

In Step S310, the controller 5 determines whether or not a downward gradient flag is 1. The controller 5 performs the processing of Step S45 if the downward gradient flag is 0. On the other hand, the processing of Step S311 is performed if the downward gradient flag is 1.

In Step S311, the controller 5 selects the output characteristic table for downward gradient as the target output characteristic table.

In Step S312, the controller 5 determines whether or not the accelerator operation amount is smaller than the downward gradient detecting accelerator operation amount. The controller 5 performs the processing of Step S313 if the accelerator operation amount is smaller than the downward gradient detecting accelerator operation amount while performing the processing of Step S49 unless otherwise.

In Step S313, the controller 5 changes the output characteristic table from the currently selected one to the target output characteristic table.

Figure 22:
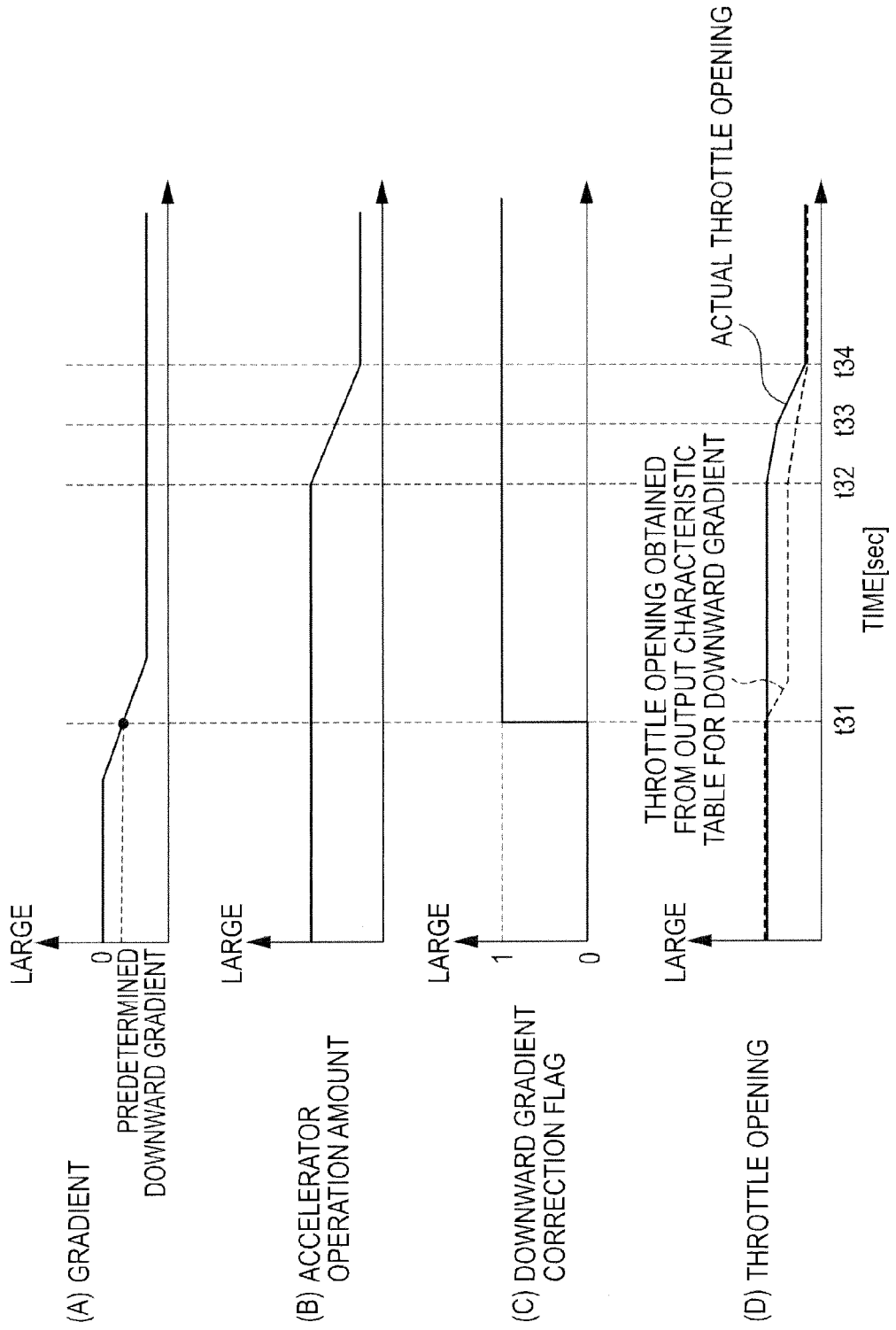
FIG. 22 is a time chart showing the operation of an output characteristic control according to the third embodiment of the present invention.

FIG. 22 is a time chart showing the operation of an output characteristic control according to the present embodiment when the acceleration correction flag and the gradient correction flag are 0 and the downward gradient correction flag is 1.

When the road gradient becomes equal to or smaller than the predetermined downward gradient (FIG. 22(A); Yes in S301) at time t31, the downward gradient correction flag is set to 1 (FIG. 22. (C); S303) and the output characteristic table for downward gradient is set according to the road gradient (S305).

Since the acceleration correction flag and the gradient correction flag are 0, the output characteristic table for gradient is set as the target output characteristic table (Yes in S310, S311).

When the accelerator pedal is returned at time t32 and the accelerator operation amount is detected to be smaller than the downward gradient detecting accelerator operation amount (accelerator operation amount at time t31) at time t33 (FIG. 22(B); Yes in S312), the output characteristic table is changed from the currently selected output characteristic table to the output characteristic table for downward gradient set as the target output characteristic table (S313).

Then, the throttle opening is gradually changed to the throttle opening calculated by referring to the output characteristic table for downward gradient from time t33 to time t34 (FIG. 22(D)).

According to the present embodiment described above, the output characteristic table for downward gradient is selected as the output characteristic table and the value of the throttle opening corresponding to the accelerator operation amount is reduced when the road gradient becomes equal to or smaller than the predetermined downward gradient, i.e. when the own vehicle is running on a downhill.

In this way, an output characteristic of being difficult to accelerate even if the accelerator pedal is depressed can be set. Thus, even if the driver depresses the accelerator pedal more than necessary particularly when the vehicle is running on a downhill and easily accelerated, it can be suppressed that the vehicle is accelerated more than necessary.

Further, in the present embodiment, the minute output region where the engine output is held at the predetermined minute output when the accelerator operation amount is small is provided in the output characteristic table for downward gradient.

The acceleration of the vehicle can be suppressed even if the accelerator pedal is excessively depressed when it is desired to accelerate by depressing the accelerator pedal only a little in the state where the vehicle is running on a downhill by using engine brake without depressing the accelerator pedal. Therefore, the vehicle speed can be easily adjusted.

Fourth Embodiment

Next, a fourth embodiment of the present invention is described. The fourth embodiment of the present embodiment differs from the first embodiment in the output characteristic table for downward gradient. The following description is centered on that point of difference. It should be noted that, in the following description, a speed ratio means a value obtained by dividing the rotation speed of an input shaft of a transmission by that of an output shaft.

When a vehicle is coast-running on a downhill by using engine brake without depressing an accelerator pedal, the acceleration of the vehicle changes according to a speed ratio of a transmission. Specifically, the higher the speed ratio, the higher the acceleration of the vehicle.

In the present embodiment, the speed ratio is changed to achieve an acceleration predetermined according to a road gradient when the road gradient becomes equal to or smaller than a predetermined downward gradient and an accelerator operation amount becomes zero. Specifically, the transmission is controlled to increase the speed ratio as a downward road gradient increases, so that the vehicle is not excessively accelerated.

Accordingly, the speed ratio is relatively high when the vehicle is coast-running on a downhill. Thus, in the case of accelerating the vehicle by depressing the accelerator pedal only a little in the state where the vehicle is coast-running on the downhill, a desired acceleration can be achieved if the transmission is controlled to reduce the speed ratio even without increasing an engine output.

Accordingly, in the present embodiment, a shift control region where the vehicle is accelerated by keeping a throttle opening fully closed and reducing the speed ratio even if the accelerator pedal is depressed is provided in an output characteristic table for downward gradient.

Figure 23:
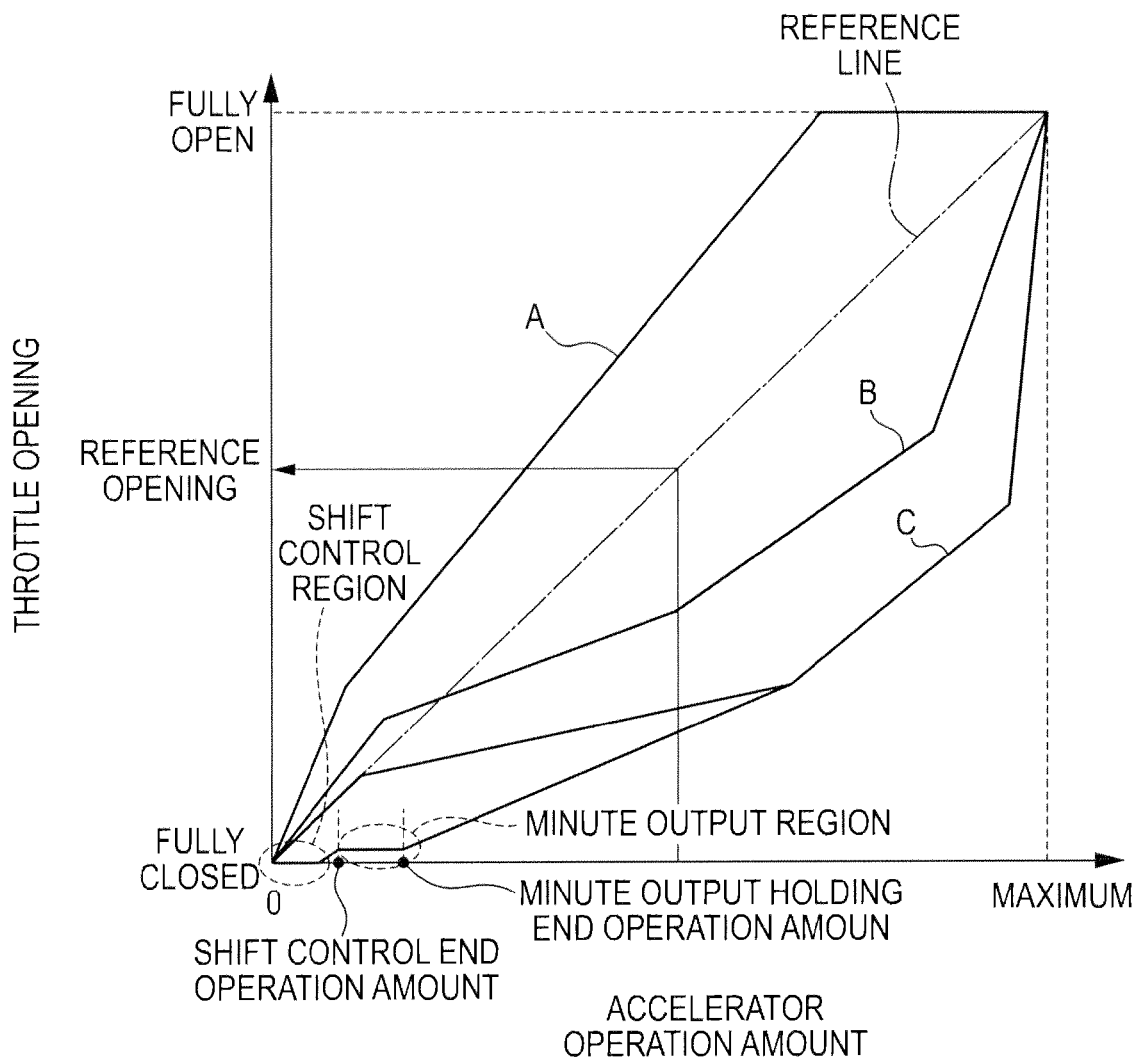
FIG. 23 is a graph showing an output characteristic table for downward gradient according to a fourth embodiment of the present invention.

FIG. 23 is a graph showing the output characteristic table for downward gradient according to the present embodiment.

As shown in FIG. 23, the output characteristic table for downward gradient according to the present embodiment includes the shift control region where the throttle opening is kept fully closed until the accelerator operation amount reaches a predetermined shift control end operation amount (second operation amount). Further, a minute output region is provided where the engine output is held at a predetermined minute output until the accelerator operation amount reaches a predetermined minute output holding end operation amount (first operation amount) from the shift control end operation amount.

Figure 24:
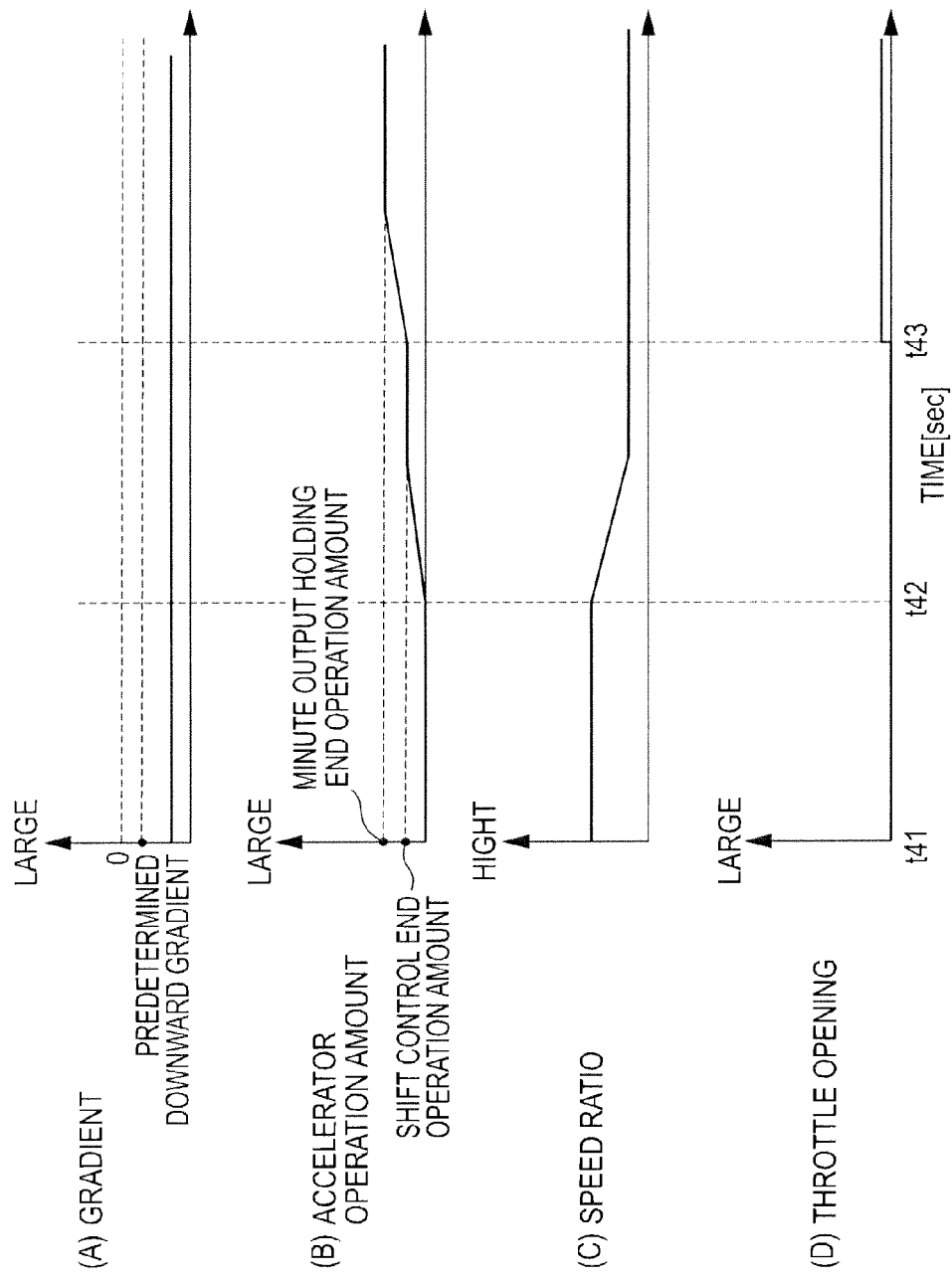
FIG. 24 is a time chart showing the operation of an output characteristic control according to the fourth embodiment of the present invention.

FIG. 24 is a time chart showing the operation of an output characteristic control according to the present embodiment when an acceleration correction flag and a gradient correction flag are 0 and a downward gradient correction flag is 1. It should be noted that, in this time chart, the output characteristic table is already changed to the output characteristic table for downward gradient at time t41.

The vehicle is coast-running on a downhill between time t41 and time t42. Thus, the speed ratio is controlled to a relatively large speed ratio corresponding to the road gradient to suppress the acceleration.

When the accelerator pedal is depressed at time t42, the vehicle is accelerated by reducing the speed ratio while keeping the throttle opening fully closed until the accelerator operation amount exceeds the shift control end operation amount at time t43. Specifically, with the throttle opening kept fully closed, the speed ratio is reduced to accelerate the vehicle by returning the speed ratio from the relatively large setting corresponding to the road gradient to the setting during running on a flat road. When the accelerator operation amount exceeds the shift control end operation amount at time t43, the throttle opening is increased so that the engine output becomes a minute output.

As just described, in the present embodiment, the vehicle is accelerated by reducing the speed ratio with the throttle opening kept fully closed until the accelerator operation amount exceeds the shift control end operation amount. That is, until the accelerator operation amount exceeds the shift control end operation amount, the vehicle is accelerated by continuing coast running with the engine output kept at zero and reducing the speed ratio. Since coast running can be continued in this way until the accelerator operation amount exceeds the shift control end operation amount, a fuel-cut state can be maintained. Therefore, according to the present embodiment, fuel economy is further improved in addition to obtaining effects similar to those of the third embodiment.

Fifth Embodiment

Next, a fifth embodiment of the present invention is described. The fifth embodiment of the present invention differs from the first embodiment in that an acceleration requested by a driver is set as a basic target acceleration without setting a recommended vehicle speed when blinkers are operating or when an accelerator operation amount is not smaller than a predetermined overtaking operation amount. The following description is centered on that point of difference.

In the first embodiment, a control is executed to set the recommended vehicle speed to a vehicle speed lower than the speed limit according to the inter-vehicle distance and set the output characteristic of the engine 1 to the output characteristic of being difficult to accelerate even if the accelerator pedal is depressed when the inter-vehicle distance to the preceding vehicle becomes shorter.

However, depending on a running scene, it may be desired to shorten the inter-vehicle distance to the preceding vehicle while accelerating the vehicle to overtake the preceding vehicle. If the output characteristic of the engine 1 is set to the output characteristic of being difficult to accelerate as the inter-vehicle distance to the preceding vehicle becomes shorter, driving performance is deteriorated.

In the first embodiment, when the accelerator operation speed becomes higher than the predetermined speed, the presence of a sudden acceleration request is judged and a control is executed to also deal with such a case. However, in such a case, the accelerator operation speed is not necessarily higher than the predetermined speed and the driver's intention to overtake the preceding vehicle or shorten the inter-vehicle distance to the preceding vehicle may not be sufficiently reflected.

Accordingly, in the present embodiment, the acceleration requested by the driver is set as the basic target acceleration without setting the recommended vehicle speed when the blinkers are operating or when the accelerator operation amount is not smaller than the predetermined overtaking operation amount.

Figure 25:
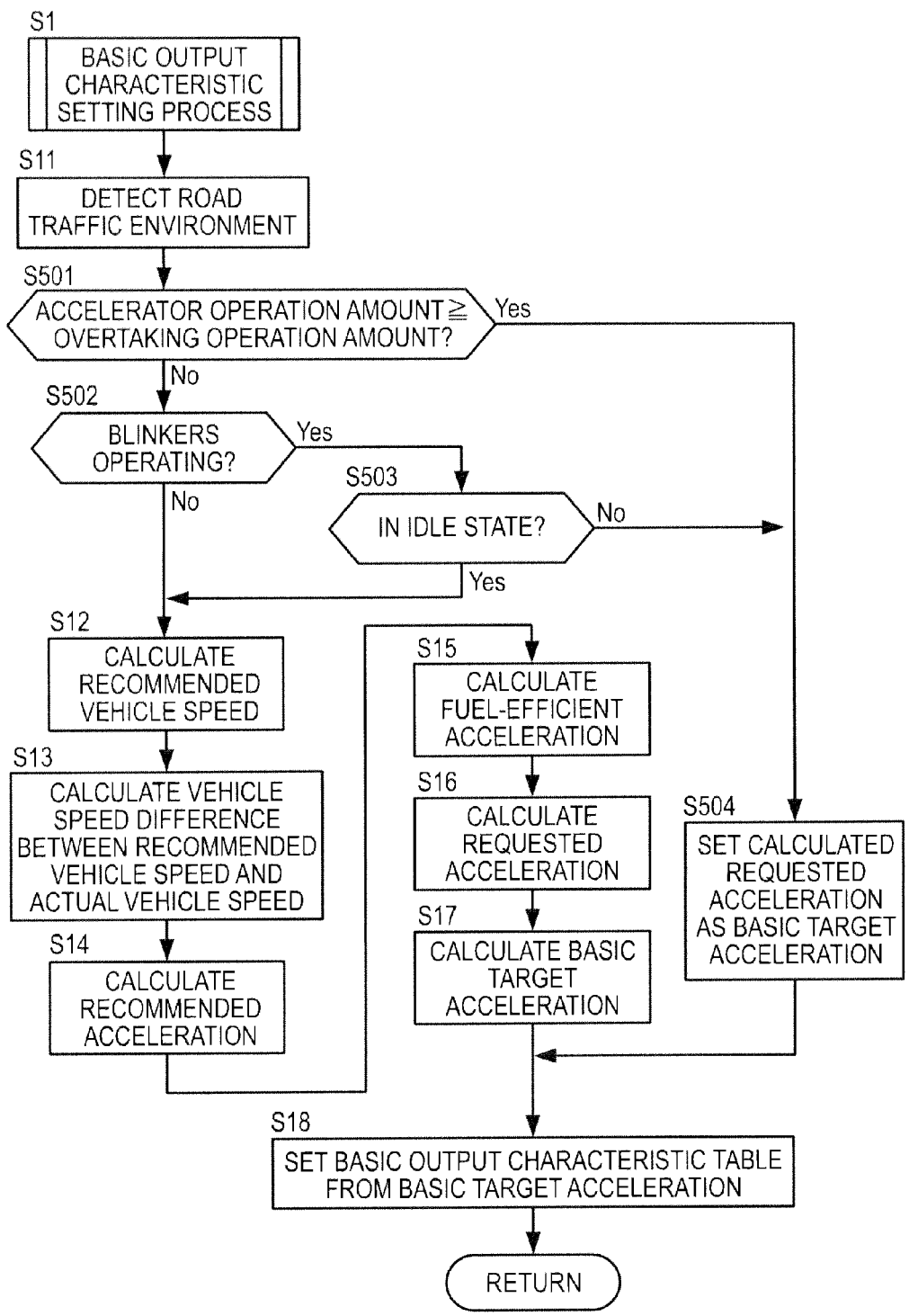
FIG. 25 is a flow chart showing a basic output characteristic setting process according to a fifth embodiment of the present invention.

FIG. 25 is a flow chart showing a basic output characteristic setting process according to the present embodiment.

In Step S501, the controller 5 determines whether or not the accelerator operation amount is not smaller than the overtaking operation amount. The controller 5 performs the processing of Step S504 if the accelerator operation amount is not smaller than the overtaking operation amount. On the other hand, the processing of Step S502 is performed if the accelerator operation amount is smaller than the overtaking operation amount.

In Step S502, the controller 5 determines whether or not the blinkers are operating. The controller 5 performs the processing of Step S503 if the blinkers are operating. On the other hand, the processing of Step S12 is performed unless the blinkers are operating.

In Step S503, the controller 5 determines whether or not the vehicle is in an idle state. Specifically, whether or not an idle switch is on is determined. It should be noted that the idle switch is a switch which is on when the accelerator operation amount is zero and turned off when the accelerator pedal is depressed. The controller 5 proceeds the process to Step S12 if the vehicle is in the idle state. On the other hand, the process proceeds to Step S504 unless the vehicle is in the idle state.

In Step S504, the controller 5 calculates a requested acceleration by a method similar to that in Step S16 and sets the calculated requested acceleration as the basic target acceleration.

According to the present embodiment described above, the acceleration requested by the driver is set as the basic target acceleration without setting the recommended vehicle speed when the blinkers are operating or when the accelerator operation amount is not smaller than the predetermined overtaking operation amount.

In this way, since the acceleration as requested by the driver can be achieved such as when the vehicle overtakes the preceding vehicle or it is desired to shorten the inter-vehicle distance to the preceding vehicle, the deterioration of driving performance can be suppressed.

Although the embodiments of the present invention have been described above, the above embodiments are merely illustration of some of application examples of the present invention and not intended to limit the technical scope of the present invention to the specific configurations of the above embodiments.

Although the value of the throttle opening corresponding to the accelerator operation amount has been changed to change the output characteristic of the engine 1 in the above embodiments, there is no limitation to this. For example, the output characteristic of the engine 1 may be changed by changing a fuel injection amount. Further, in the case of a variable valve device capable of continuously changing a lift/operating angle of the intake valve, the output characteristic of the engine 1 may be changed by controlling a lift amount of the intake valve by that variable valve device.

Further, although the road gradient is detected by the navigation device 4, it may be calculated based on detection values of an acceleration sensor for detecting front and rear accelerations of the vehicle.

Further, in the above third embodiment, a gain suitable for downhill may be set and a control may be executed as in the second embodiment when the road gradient becomes equal to or smaller than the predetermined downward gradient.

The present application claims a priority based on Japanese Patent Application No. 2011-9601 filed with the Japan Patent Office on Jan. 20, 2011 and Japanese Patent Application No. 2011-143177 filed with the Japan Patent Office on Jun. 28, 2011, all the contents of which are hereby incorporated by reference.

The invention claimed is:

1. An output characteristic control device for controlling an output characteristic of an internal combustion engine mounted in a vehicle, comprising:
　　a road traffic environment detection unit configured to detect a road traffic environment in which an own vehicle is running;
　　a recommended vehicle speed calculation unit configured to calculate a recommended vehicle speed of the own vehicle in the detected road traffic environment;
　　a target output characteristic setting unit configured to reduce an output of the internal combustion engine corresponding to an accelerator operation amount as a vehicle speed difference between the recommended vehicle speed and an own-vehicle speed decreases and set a target output characteristic of the internal combustion engine to such an output characteristic suitable for constant running at the recommended vehicle speed when the vehicle speed difference between the recommended vehicle speed and the own-vehicle speed becomes substantially zero; and
　　an output characteristic changing unit configured to change the output characteristic of the internal combustion engine to the target output characteristic.

2. The output characteristic control device for the internal combustion engine according to claim 1, further comprising:
　　an acceleration determination unit configured to determine whether or not a driver has any intention to accelerate the own vehicle based on an accelerator operation; and
　　a during-acceleration correction unit configured to correct the target output characteristic of the internal combustion engine to such a characteristic that the output of the internal combustion engine corresponding to the accelerator operation amount becomes relatively large when it is determined that the driver has an intention to accelerate the own vehicle.

3. The output characteristic control device for the internal combustion engine according to claim 2, wherein:
　　the during-acceleration correction unit ends the correction when the own-vehicle speed has increased by a predetermined vehicle speed, a predetermined time has elapsed, or the own vehicle has run a predetermined distance after it is determined that there is the intention to accelerate the own vehicle.

4. The output characteristic control device for the internal combustion engine according to claim 2, wherein:
　　the output characteristic changing unit changes the output characteristic of the internal combustion engine to the target output characteristic so that a response speed of the internal combustion engine corresponding to the accelerator operation amount becomes relatively high when it is determined that the driver has the intention to accelerate the own vehicle.

5. The output characteristic control device for the internal combustion engine according to claim 1, further comprising:
a gradient correction unit configured to correct the target output characteristic of the internal combustion engine so that the output of the internal combustion engine corresponding to the accelerator operation amount increases as a road gradient increases.

6. The output characteristic control device for the internal combustion engine according to claim 1, wherein:
the output characteristic changing unit changes the output characteristic of the internal combustion engine to the target output characteristic thereof when the accelerator operation amount becomes larger than the accelerator operation amount when the target output characteristic was set if the target output characteristic of the internal combustion engine is a characteristic to make the output of the internal combustion engine corresponding to the accelerator operation amount larger than the current output characteristic.

7. The output characteristic control device for the internal combustion engine according to claim 1, wherein:
the output characteristic changing unit gradually changes the output characteristic of the internal combustion engine to the target output characteristic.

8. The output characteristic control device for the internal combustion engine according to claim 1, further comprising:
a downward gradient correction unit configured to correct the target output characteristic of the internal combustion engine to reduce the output of the internal combustion engine corresponding to the accelerator operation amount as a downward gradient becomes steeper when a road gradient becomes equal to or smaller than a predetermined downward gradient.

9. The output characteristic control device for the internal combustion engine according to claim 8, wherein:
the downward gradient correction unit corrects the target output characteristic of the internal combustion engine so that the output of the internal combustion engine is a predetermined output slightly higher than an output necessary to maintain an idle state when the accelerator operation amount is not larger than a predetermined first operation amount.

10. The output characteristic control device for the internal combustion engine according to claim 9, further comprising:
a speed ratio control unit configured to reduce a speed ratio when an accelerator pedal is depressed in a state where the own vehicle is coast-running on a road whose gradient is not larger than the downward gradient, wherein:
the downward gradient correction unit corrects the target output characteristic of the internal combustion engine so that the output of the internal combustion engine becomes zero when the accelerator operation amount is not larger than a predetermined second operation amount smaller than the predetermined first operation amount.

11. The output characteristic control device for the internal combustion engine according to claim 1, further comprising:
a requested acceleration calculation unit configured to calculate an acceleration requested by a driver according to the accelerator operation amount, wherein:
the target output characteristic setting unit sets the target output characteristic of the internal combustion engine based on the requested acceleration when blinkers are operating.

12. The output characteristic control device for the internal combustion engine according to claim 1, further comprising:
a requested acceleration calculation unit configured to calculate an acceleration requested by a driver according to the accelerator operation amount, wherein:
the target output characteristic setting unit sets the target output characteristic of the internal combustion engine based on the requested acceleration when the accelerator operation amount is not smaller than a predetermined overtaking operation amount.

13. An output characteristic control device for controlling an output characteristic of an internal combustion engine mounted in a vehicle, comprising:
a road traffic environment detection unit configured to detect a road traffic environment in which an own vehicle is running;
a recommended vehicle speed calculation unit configured to calculate a recommended vehicle speed of the own vehicle in the detected road traffic environment;
a target output characteristic setting unit configured to reduce an output of the internal combustion engine corresponding to an accelerator operation amount as a vehicle speed difference between the recommended vehicle speed and an own-vehicle speed decreases and set a target output characteristic of the internal combustion engine to such an output characteristic suitable for constant running at the recommended vehicle speed when the vehicle speed difference between the recommended vehicle speed and the own-vehicle speed becomes smaller; and
an output characteristic changing unit configured to change the output characteristic of the internal combustion engine to the target output characteristic.

* * * * *